(12) United States Patent
Powell

(10) Patent No.: US 12,434,653 B2
(45) Date of Patent: Oct. 7, 2025

(54) CHILD RESTRAINT DEVICE WITH AIRBAG

(71) Applicant: CYBEX GmbH, Bayreuth (DE)

(72) Inventor: Iain Powell, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 18/568,205

(22) PCT Filed: Jun. 7, 2022

(86) PCT No.: PCT/EP2022/065322
§ 371 (c)(1),
(2) Date: Dec. 7, 2023

(87) PCT Pub. No.: WO2022/258571
PCT Pub. Date: Dec. 15, 2022

(65) Prior Publication Data
US 2024/0278744 A1 Aug. 22, 2024

(30) Foreign Application Priority Data

Jun. 8, 2021 (DE) ............ 20 2021 103 088.7
Oct. 28, 2021 (DE) ............ 10 2021 128 108.3

(51) Int. Cl.
*B60R 21/207* (2006.01)
*B60R 21/2334* (2011.01)
*B60R 21/239* (2006.01)

(52) U.S. Cl.
CPC ...... *B60R 21/2072* (2013.01); *B60R 21/2334* (2013.01); *B60R 21/239* (2013.01)

(58) Field of Classification Search
CPC ............ B60R 21/2072; B60R 21/2334; B60R 21/239
See application file for complete search history.

(56) References Cited

U.S. PATENT DOCUMENTS 5,184,844 A    2/1993  Goor
5,292,175 A *  3/1994  Artz ............... B60N 2/2881
                                              297/452.41
(Continued)

FOREIGN PATENT DOCUMENTS

DE    4418028 A1   11/1995
DE   19534126 C1   10/1996
(Continued)

OTHER PUBLICATIONS

"International Application No. PCT/EP2022/065322, International Search Report and Written Opinion mailed Nov. 22, 2022", (Nov. 22, 2022), 37 pgs.

(Continued)

*Primary Examiner* — Faye M Fleming
(74) *Attorney, Agent, or Firm* — Schwegman Lundberg & Woessner, P.A.

(57) ABSTRACT

Child restraint device, in particular child seat and impact shield, for mounting in a vehicle, or component of such a device, comprising at least one airbag with at least one inflatable gas bag, wherein the gas bag is transferable from a non-inflated state to an inflated state, wherein the gas bag is at least substantially non-folded in the non-inflated state, or wherein an outer surface of the gas bag in the non-inflated state of the gas bag is configured such that, for at most 25% of the outer surface it applies that a respective outer surface perpendicular intersects the outer surface at a second point of the outer surface, or wherein, in the non-inflated state of the at least one gas bag, at most 25% of the outer surface of the gas bag directly abuts on another part of the outer surface.

20 Claims, 14 Drawing Sheets

(56) References Cited

U.S. PATENT DOCUMENTS

Figure 1:
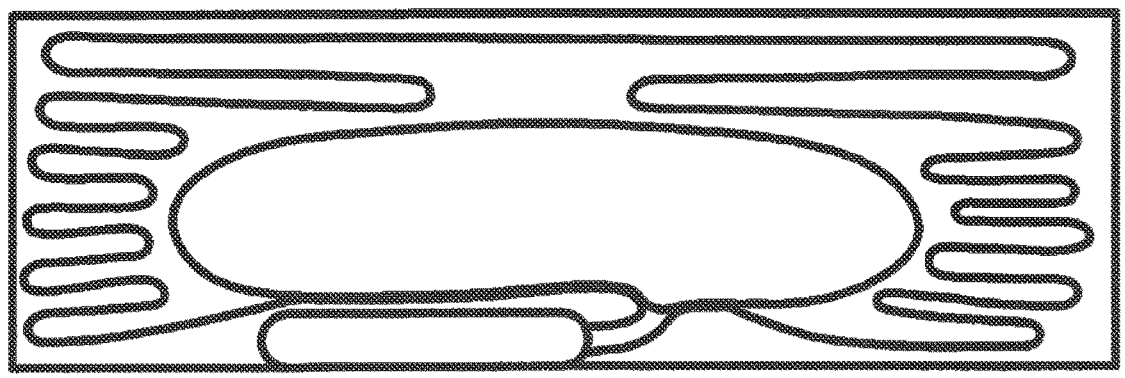

| | | | |
|---|---|---|---|
| 5,375,908 A | 12/1994 | Goor | |
| 6,736,455 B1 | 5/2004 | Zakovic et al. | |
| 7,232,182 B2 * | 6/2007 | Yoshida | B60R 21/2338 297/216.11 |
| 7,293,828 B2 * | 11/2007 | Yoshida | B60R 21/2338 297/216.12 |
| 7,748,781 B2 * | 7/2010 | Bass | B60N 2/2809 297/219.12 |
| 9,126,557 B2 * | 9/2015 | Renaudin | B60N 2/266 |
| 2004/0251721 A1 | 12/2004 | Yoshida | |
| 2009/0179470 A1 | 7/2009 | Bass | |
| 2009/0224580 A1 | 9/2009 | Fritz et al. | |
| 2015/0054263 A1 | 2/2015 | Renaudin et al. | |

FOREIGN PATENT DOCUMENTS

| | | | |
|---|---|---|---|
| DE | 19722095 C1 | 12/1998 | |
| DE | 10157707 A1 | 6/2003 | |
| DE | 602004001528 T2 | 8/2006 | |
| DE | 102007003990 A1 * | 7/2008 | ........... B60N 2/2812 |
| DE | 102011076703 A1 | 12/2012 | |
| DE | 202017105118 U1 | 11/2018 | |
| DE | 102017126235 A1 | 5/2019 | |
| EP | 1452386 A1 | 9/2004 | |
| EP | 1486384 A2 | 12/2004 | |
| EP | 1452406 B1 | 7/2006 | |
| GB | 2260780 A | 4/1993 | |
| IT | UB20155831 A1 | 5/2017 | |
| JP | 2001341611 A | 12/2001 | |
| WO | WO-2011050609 A1 | 5/2011 | |
| WO | WO-2018052976 A1 | 3/2018 | |
| WO | WO-2022258571 A1 | 12/2022 | |

OTHER PUBLICATIONS

"European Application No. 22731694.0, Communication from the Examining Diviision dated Dec. 20, 2024", (Dec. 20, 2024), 7 pgs.

* cited by examiner

CHILD RESTRAINT DEVICE WITH AIRBAG

PRIORITY CLAIM TO RELATED APPLICATIONS

This application is a U.S. national stage filing under 35 U.S.C. § 371 from International Application No. PCT/EP2022/065322, filed on 7 Jun. 2022, and published as WO2022/258571 on 15 Dec. 2022, which claims the benefit under 35 U.S.C. 119 to German Application No. 20 2021 103 088.7, filed on 8 Jun. 2021, and the benefit under 35 U.S.C. 119 to German Application No. 10 2021 128 108.3, filed on 28 Oct. 2021, the benefit of priority of each of which is claimed herein, and which applications and publication are hereby incorporated herein by reference in their entirety.

DESCRIPTION

The invention relates to a child restraint device, in particular a child seat and/or impact shield, for mounting in a vehicle seat, comprising at least one airbag with at least one inflatable gas bag.

DE 4 418 028 A1 describes a child seat with an impact shield, which in turn comprises an airbag. The airbag is arranged in an upper section of the impact shield in order to protect the head of the child sitting in the child seat (in the event of a collision).

DE 20 2017 105 118 U1 also discloses a child seat with an impact shield. According to this state of the art, an airbag can be arranged at various points, for example in an upper section or in a lower section of the impact shield or in the centre of the impact shield, in order to strut apart an upper and a lower section of the impact shield from one another.

DE 10 2017 126 235 A1 describes a child seat with an impact shield that has an airbag that is arranged either in a lower section or a rear section (facing the child sitting in the child seat).

DE 19 722 095 C1 describes a child seat with a support bracket in which an airbag is arranged. In case of triggering, a gas bag of the airbag unfolds, which should take place in as controlled a manner as possible.

DE 4 418 028 B4 shows various ways of positioning an airbag on a child seat. A gas generator is arranged directly next to the gas bag in each case.

U.S. Pat. No. 5,375,908 A shows a child seat with an airbag, whereby a gas generator is arranged in the seat part of the child seat.

DE 19 534 126 C1 describes a gas cartridge integrated into a seat part of a child seat, which feeds an airbag via a pressurised line.

EP 1 452 386 B1 describes an airbag in a chest pad, which is arranged in a hollow housing.

U.S. Pat. No. 6,736,455 B1 describes an airbag that is arranged under a cushion-like section in its initial state.

So far, the various airbag solutions have not been able to establish themselves on the market. This is possibly due to the fact that requirements which are sometimes difficult to reconcile, such as a safe and reliable use of the airbag (in particular avoidance or at least reduction of any risks which may only result from the airbag), have not yet been satisfactorily solved for child restraint systems or child seats at an acceptable design effort, in particular with regard to manufacturing costs.

It is therefore the object of the invention to propose a child restraint device, in particular child seat and/or impact shield, for mounting in a vehicle (in particular in a motor vehicle), and/or a component of such a device, wherein a comparatively high level of safety for the child held by the child restraint device is to be ensured, preferably in the simplest possible manner in terms of design. In particular, risks that may only result from the airbag should be reduced or avoided as far as possible.

This object is solved in particular by the features of claim 1.

In the context of the aspects of the invention explained below, the term "child" is intended in particular to include persons aged from 0 to 12 years, for example babies (aged from 0 to 12 months) and/or infants (aged from 1 to 3 years).

A child seat is to be understood in particular as a seat (unless otherwise specified below) that can be mounted to or on a vehicle seat (in particular a motor vehicle seat, preferably a car seat) and can be removed again from this vehicle seat. The child seat does not necessarily (but can) be configured such that the child sits in it. Seats (such as infant carriers) that also (or possibly exclusively) allow the child to be positioned in a lying position are to be understood as child seats. In particular, an infant carrier, a seat for an infant and/or a booster seat should be understood as examples of a child seat. The child seat may be a special type (e.g. infant carrier, in particular with carrying handle) or a seat that is designed for different age groups and/or is convertible in such a way that it can be used for different age groups (or is convertible accordingly).

The child seat can be configured such that the child faces forward when in use, or configured such that the child faces backwards, or configured such that the child faces sideways. Also, a child seat in which different viewing directions are possible (in particular rotatable child seats) is conceivable.

The child seat preferably has a main body that comprises at least one seat section. The main body can also have a (possibly adjustable) backrest and/or (possibly adjustable) side wings and/or (possibly adjustable) armrests and/or a (possibly adjustable) headrest and/or a (possibly adjustable) side impact protection and/or at least one (first) fastening device for fastening an impact shield on the main body of the child seat (such as, for example, a first part of an impact shield fastening device which is configured in order to cooperate with a second part of the impact shield fastening device in order to mount the impact shield on the main body).

For example, the child seat may comprise a (or the) impact shield.

Furthermore, the child seat can comprise a support foot and/or a top tether and/or at least one belt guide for guiding a vehicle belt and/or at least one second fastening device (for example Isofix anchor or fastening device for latch system or hooks) in order to fasten the child seat detachably to the (motor) vehicle seat and/or at least one third fastening device (for example rods and/or anchors and/or hooks) in order to fasten the child seat (detachably) to a base.

A base of the child seat or for the child seat may be configured to receive the child seat, wherein the base may have at least one fourth fastening device (for example at least one rod or at least one anchor and/or at least one hook) to (detachably) mount the child seat (for example in cooperation with the third fastening device) and/or at least one belt guide to guide a (vehicle) belt and/or at least one fifth fastening device (for example an Isofix anchorage or a latch system) to (detachably) mount or fasten the base to the (motor) vehicle seat.

An impact shield should be understood in particular as a restraint device to hold the child instead of or in addition to a belt system. In particular, in contrast to a belt system, such an impact shield should preferably have an (at least substantially) solid (dimensionally stable) section which preferably restrains at least the abdominal region (abdomen) of the child and/or which is preferably configured to be supported (possibly fixed) on a left side and a right side of the main body of the child seat. The solid section may consist of (at least 50 wt. %, preferably at least 80 wt. %) an at least substantially non-porous and/or non-foamed material and/or a polymer, preferably polyamide and/or polyolefin, such as PP or PE. The solid section can form at least 20 wt. %, preferably at least 50 wt. %, of the impact shield and/or have a weight of at least 100 g or at least 250 g and/or at most 2.0 kg or at most 1.0 kg.

The impact shield may further have at least one soft section or at least one (shock) cushioning device and/or at least one sixth fastening device for fastening the impact shield to the main body of the child seat and/or at least one belt guide (preferably at a front end, in particular as a, preferably elongated, trough, and/or extending horizontally and/or form at least one tab and/or eyelet for threading the belt through). The sixth fastening device may be a second part of an impact shield fastening device that is configured to cooperate with the first fastening device (as first part of the impact shield connection device) to attach (possibly latch) the impact shield to the main body. The soft section may consist of (at least 50 wt. %, preferably at least 80 wt. %) a porous and/or foamed material and/or a polymer, preferably EPS and/or EPP. The soft section may form at least 5 wt. %, preferably at least 10 wt. %, of the impact shield and/or have a weight of at least 50 g or at least 100 g and/or at most 800 g or at most 500 g.

An airbag should preferably be understood as a system having at least one (inflatable) gas bag, a gas generator, a control device (controller) and a sensor.

The gas bag is preferably formed at least in sections from a plastic (such as a polyamide and/or polyolefin).

The sensor preferably comprises at least one impact sensor which is configured to measure (and provide) at least one impact parameter, for example a (current) acceleration, and which is connected (for example by cable or wirelessly) to the control device.

The control device preferably comprises a power supply (such as a battery). Further preferably, a control software or a corresponding algorithm is stored in the control device in order to control the activation and/or the triggering (inflation) of the airbag. In this context, the airbag should be regarded as activated if it is in a state in which a transfer to the (inflated) functional state is generally possible, so that the actual transfer to the functional state depends at least essentially only on the at least one parameter of the sensor. Contrary to that, the airbag should be regarded as deactivated if it is in a state in which such a transfer to the functional state is not possible (regardless of which parameter is measured or provided by the sensor).

If, for example, the result of the control software (the algorithm) is such that at least one predetermined condition is fulfilled (for example, a predetermined speed is exceeded), the control device triggers the gas generator so that the (inflatable) gas bag is inflated (or in other words, so that the airbag is transferred to its functional state).

The functional state of the airbag refers in particular to a state in which the airbag is filled with gas (completely or at least partially, for example at least 50%, based on a possible maximum volume) and is therefore configured to absorb and/or cushion forces that occur, for example when a child hits the airbag (to a certain extent). In contrast, the resting state should preferably be a state in which the airbag is (at least substantially) empty (or deflated), in particular so that inner surfaces of the gas bag can touch each other, so that corresponding forces (due to an impacting person) are not absorbed and/or cushioned, or only to a (significantly) lesser extent.

The at least one impact sensor can preferably be arranged on or adjacent to the second, third, fourth or fifth fastening device, or arranged on or at least close to (adjacent to) at least one belt guide for the vehicle belt, preferably in such a way that the sensor (in the mounted state of the child restraint device) is arranged as close as possible to a vehicle chassis.

Individual aspects of the invention are explained below, which are referred to as first, second, third etc. aspect. These aspects each comprise individually explained sub-aspects. Each of the aspects is to be regarded as an independent solution of the invention. Particularly preferably, however, several (possibly all) of the aspects are combined or may be present together within a single child restraint device. In a particularly advantageous embodiment of the invention, all (respectively fundamentally independent) aspects of the invention are realised.

A. Non-Folded Airbag

According to a first independent aspect of the invention, for solving the above object a child restraint device (in particular child seat and/or impact shield) for mounting in a (motor) vehicle (or a component of such a child restraint device) is proposed, comprising at least one airbag with at least one inflatable gas bag (and at least one gas generator), wherein the gas bag is transferable from a non-inflated state to an inflated state, wherein the gas bag in the non-inflated state is (or remains) at least substantially (preferably completely) non-folded. Alternatively or additionally, an outer surface of the gas bag in the non-inflated state of the gas bag is configured such that for at most 50%, preferably at most 25%, still further preferably at most 10% of the outer surface it applies that a respective outer surface perpendicular intersects the outer surface at a second point of the outer surface. Alternatively or additionally, in the non-inflated state of the at least one gas bag, at most 50% of the outer surface of the gas bag, preferably at most 25% of the outer surface of the gas bag, still more preferably at most 10% of the outer surface of the gas bag (directly) abuts on another part of the outer surface. A (directly) abutting is to be understood in particular as a contact. If necessary, however, surfaces or surface sections that are at a distance of at most 0.5 cm, preferably at most 1 mm, should also be considered as abutting on one another. In particular, abutting surfaces should not be understood to mean that these surfaces aligned with each other (or are arranged next to each other along the respective surface). Rather, the respective surfaces or surface sections under consideration should in particular face each another.

Ultimately, an important idea of the invention is to at least largely dispense with folds of the airbag in the non-inflated state (or in the state in which the gas bag is stowed). This is a deviation from the known procedure, in which the airbag's gas bag is folded many times and very pronounced. Therein a comparatively uncontrolled unfolding is either accepted or it is attempted to achieve the most controlled unfolding possible with comparatively complex folding geometries or folding techniques. Thus, either compromises have to be made in terms of safety or the design effort increases considerably. In accordance with the invention, however, it was recognised (quite surprisingly) that in the case of child seats or impact shields (or child restraint devices in general) a safety-related advantage can also be achieved (or even more so) if in the inflated state extremely large volumes are (deliberately) dispensed with, which then in turn makes it possible in a synergistic manner to manage without (pronounced) folds in the non-inflated state. The concept according to the invention therefore also differs in particular from known airbag concepts, in which mainly a high (as high as possible) gas volume in the inflated state should be achieved. Rather, according to the invention, a respective section of the child restraint device (for example, of the impact shield) is to be displaced at least to a certain extent in the direction of the child in order to reduce a movement path of the child (until it impacts against a corresponding area of the child restraint device) and to adapt the child as quickly as possible to the dynamics of the event of the accident.

Preferably, it applies for at most 50% of the outer surface (in the non-inflated state), preferably at most 25% of the outer surface, even more preferably at most 10% of the outer surface, that a respective starting point of the outer surface under consideration abuts on another point of the outer surface that does not directly abut on the starting point.

If one regards the entire outer surface of the gas bag (in the non-inflated state) as a continuum of points, it preferably applies that those (first in the respective consideration) points which abut on a further point of the outer surface which does not abut on the (first) point directly (i.e. is firmly connected to it within the material composite in an infinitesimally neighbouring manner) make up at most 50%, preferably at most 25% of the outer surface, still further preferably at most 10% of the outer surface, of the (entire) outer surface.

According to execution, it may apply for at most 50%, further preferably at most 25%, even more preferably at most 10% of the outer surface of the gas bag in the non-inflated state, that there is a further point of the outer surface to a respective starting point of the outer surface under consideration, which can be reached via a shortest path along the surface of the gas bag of ≥1 cm and at the same time can be reached via a shortest straight path (not necessarily following the surface) of ≤0.5 cm.

B. Channels

According to a second independent (but preferably combinable with the above first independent aspect) aspect of the invention, for solving the above object a child restraint device, in particular child seat and/or impact shield, for mounting in a (motor) vehicle (or a component of such a vehicle) is proposed, comprising at least one airbag with at least one inflatable gas bag (as well as at least one gas generator), wherein the gas bag is transferable from a non-inflated state to an inflated state, wherein at least one guiding device (as component of the child restraint device, preferably of the impact shield) is associated with the at least one gas bag for guiding a gas flow during the transfer from the non-inflated state to the inflated state. Preferably, the gas bag itself (for example in its interior) has such a guiding device.

An important idea of the second aspect is that when the gas bag is inflated, the flowing gas cannot flow arbitrarily (in all directions or outwards), but is guided at least in sections in a specific direction by the guiding device. Under a guiding device is to be understood, in particular, a device that represents an obstacle for the gas flow, which the gas must flow around so that its direction is influenced accordingly. In this sense, the mantle of the gas bag or the gas bag itself (or the inner surface of the outer wall of the gas bag) is in particular not a guiding device (as it does not guide the gas flow, but only limits it to the outside). Preferably, therefore, the guiding device is a structure which is formed in addition to an outer wall that defines the gas bag (but which can certainly be connected to this outer wall, possibly also integrally connected). Preferably, the guiding device comprises at least one structure, such as a partition wall, around which flow can flow on two sides facing away from each other. The guiding device is preferably not formed by a fold.

Preferably, the guiding device comprises at least one local fixation of at least one section of an inner wall (or inner surface) of the gas bag (on which the gas abuts in the inflated state). Such a (local) fixation is in particular not an edge fixation, which is (only) intended to hold the gas bag as a whole (but does not contribute to guiding the gas flow).

Preferably, the at least one gas bag has a contact wall section that can be contacted from the outside (for example by the child in the event of an accident) and a support wall section on which the gas bag is supported on a support device of the child restraint device. Particularly preferably, the guiding device comprises a (local) approximation (preferably fixation) of the contact wall section and the support wall section to each other.

A (local) approximation should be understood in particular to mean that (in the inflated state) the contact wall section and the support wall section in a specific approximation section are at a distance from each other which is at most 0.5 times, further preferably at most 0.25 times as large as a distance from sections adjacent to the respective approximation section under consideration and/or are at a distance of preferably ≤10 cm, preferably ≤5 cm, still further preferably ≤2 cm from each other.

Possibly, the contact wall section and support wall section can also be in contact with each other in the area of the (local) approximation or even be (firmly) connected to each other.

In embodiments, the guiding device comprises at least one sewing and/or riveting and/or bonding and/or welding (preferably of two wall sections or inner wall sections of the gas bag that are not aligned next to and/or opposite each other, in particular of the contact wall section and support wall section). This allows a guiding device to be realised in a simple manner. In principle, the connection options mentioned here can be constructed in exactly the same way as connection devices for manufacturing the gas bag (but should preferably not correspond to such connections).

In general (even without the provision of a guiding device), the gas bag can be produced, for example, by sewing edges of two (or more) layers of fabric together. However, such seams should preferably not (necessarily) be understood as a guiding device in the sense of the second aspect. However, a guiding device in the sense of the second aspect may be an additional sewing (or other connection) which is not (fundamentally) necessary to form the airbag's gas bag.

At least in the inflated state (of the gas bag), at least one channel (or possibly several channels) is/are formed by the guiding device. Alternatively or additionally, a partition wall or several partition walls can be formed by the guiding device at least in the inflated state. An effective (directed) flow can be achieved in a simple manner through a channel or partition wall formed in this way. In particular, a channel is to be understood as a structure that extends at least in sections in an axial preferred direction and is closed at least in sections (in relation to a radial section) and/or has at least one channel inlet and at least one channel outlet. Particularly preferably, a plurality of channels (for example comprising at least two or at least four channels) is formed and/or a plurality of partition walls (for example comprising at least two and/or at least four). The several channels can be aligned (at least substantially) parallel to one another or can run in different directions (for example radially or away from one another and/or in a fan-like and/or star-like manner). Similarly, the several partition walls may run parallel or in different directions (for example, radially or away from each other and/or in a fan-like and/or star-like manner).

In embodiments, the at least one gas bag may have a gas inlet which is connected or connectable to a gas generator arranged outside the gas bag, or the gas generator or at least one gas outlet of a gas generator belonging to the airbag may be located inside the gas bag. Preferably, the gas bag comprises a proximal area formed by the surroundings of the gas inlet or gas outlet (of the gas generator) as well as at least one distal area remote from the gas inlet or gas outlet (of the gas generator), wherein the at least one guiding device guides the gas flow from the proximal area in the direction of the distal area (and/or in a radial direction).

In general (even without guiding device), the gas bag can have a contact surface and a support surface (and possibly also lateral sides/side surfaces or connecting surfaces). The gas generator can be connected to the gas bag (directly or indirectly via a gas connection, e.g. channel or tube) with the support surface or with (one of) the lateral surface(s). The contact surface is in particular the surface that faces outwards or with which the child comes into contact (or at least can come into contact). In particular, a support surface is to be understood as a surface which cannot come into contact with the child, that is which faces the support device (on which the airbag or at least its gas bag is then ultimately arranged). In particular, the gasbag comprises a proximal section (at or close to a gas outlet of the generator and/or at or close to a gas inlet of the gas bag) and a distal section (further away from the gas outlet or gas inlet). The guiding device can then be configured in such a way that the gas flow in the proximal-distal direction (i.e. from the proximal section to the distal section) is enabled and/or in a direction perpendicular to the proximal-distal direction is prevented or at least partially blocked by the guiding device (for example by a, in particular locally, fixing-together of wall sections).

The gas outlet of the gas generator and/or gas inlet of the gas bag can be arranged at or close to an edge (or an edge border) of the support surface and/or at or close to a side wall. In particular in this case, the guiding device may preferably be formed line-like and/or have one or more chain(s) of (local) fixations which extend from the proximal section in the direction of the distal section, for example as straight parallel line(s) or as curved (arcuate) parallel line(s) or as diverging lines.

Alternatively, the gas outlet of the gas generator and/or the gas inlet of the gas bag can be arranged in or close to a centre of the support surface. In this case, the guiding device may preferably comprise one or several line(s) or chain(s) of (local) fixations which extend from the proximal section in the direction of the distal section, for example as (a set of) straight parallel lines or as (a set of) curved (arcuate) parallel lines or as diverging lines.

Between such lines or chains and/or between at least one line (or chain) and an adjacent edge of the gas bag, at least one channel (preferably channels) can be formed which direct the gas flow.

Preferably, the gas bag supports itself on a support device (in particular the above), wherein the guiding device comprises at least one structuring (preferably one, in particular channel-like or groove-like depression) of the support device, wherein the structuring is preferably at least partially assigned to a corresponding structuring of the gas bag, preferably such that at least one (preferably elongate) elevation (in particular web) of the support device is at least partially in alignment (in plan view one above the other) with at least one fixation or at least approximation of two inner wall sections of the gas bag. However, such a (possibly provided) elevation (web) of the support device does not necessarily have to be (partially) in alignment with at least one fixation or approximation of two inner wall sections. At least one web of the support device (in particular if it is in alignment with at least one fixation or approximation of two inner wall sections) can advantageously contribute to the fact that a (in particular guided) gas flow also takes place or can take place when a body part of the child (in particular its chest and/or stomach) presses against the respective section of the gas bag (in particular if it is a section that faces the child, i.e. a rear section of the impact shield).

Particularly preferred the guiding device is arranged at least (or only) on a rear side of a (the) impact shield, in particular (in the state of use of the impact shield) running or orientated from bottom to top. In particular, the channels and/or partition walls according to execution extend in such a direction (and/or are arranged, if necessary only, in this area). By this it can be achieved in particularly effective manner that (even with abutting chest or stomach area of the child in the event of an impact) gas can be effectively channeled also into other areas of the gas bag (and that a gas flow is not or at least not too early cut off by the child's body). By this the safety is increased.

In an even more general sense, the second (independent) aspect of the invention relates to a child restraint device (e.g., child seat and/or impact shield) with an airbag, wherein structures are present to improve a gas flow within the gas bag of the airbag (during inflation). In particular, the gas bag can comprise at least one device that improves the gas flow within the gas bag of the airbag (during inflation), for example by means of a corresponding guiding (or control).

The gas bag may be at least in sections at least substantially flat (in particular as defined below). In such a case, the guiding device is preferably designed in such a way that in the (respective) flat section a guiding of the gas flow occurs. The guiding device is particularly preferably arranged in this area.

With a combination of a flat design of the gas bag with such a guiding device, a safe and fast inflation of the gas bag can be ensured in a comparatively simple manner. In particular, a (sufficient) gas flow can also be enabled with such a flat design if the flat section is already subjected to an external pressure (for example by a child that presses against the flat section in the event of an impact).

The guiding device can realise (or at least facilitate) the formation of at least one flat section, for example by the above explained approximation or fixing-together of wall sections. In this way, an effective guiding and also a (possibly desired) flat formation of the gas bag can be achieved simultaneously in a simple manner.

By the guiding device according to the invention a safe inflation of the airbag can be achieved in an effective and simple manner and, in particular, also the risk that some areas of the gas bag are inflated at all (or only incompletely) be reduced (or completely avoid), as they are cut-off by the body of the child that is accelerated forward (in the event of an impact). Overall, by this the safety with is improved by simple measures, especially also in case of a comparatively flat airbag (in the inflated state).

C. Position Gas Generator

According to a third independent aspect of the invention, the above object is preferably solved by a child restraint device, in particular child seat and/or impact shield, preferably a child seat with impact shield, for mounting in a vehicle, or a component of such a device, preferably according to the first and/or second aspect, comprising at least one airbag with at least one inflatable gas bag (and at least one gas generator), wherein the gas bag is transferable from a non-inflated state to an inflated state, wherein the gas generator is arranged in an interior of the gas bag or (alternatively) on an underside and/or front side of the gas bag and/or wherein at least one gas inlet opening into the gas bag is arranged in a lower and/or front area of the gas bag.

In relation to a positioning with respect to the gas bag, the front (or the front area) shall describe a section that faces away (or is distant) from the child; the rear (or the rear area) a section that faces the child (or on which a stomach/a chest of the child abuts); the bottom (or a lower area) a section that faces the child's legs (or on which the child's legs abut); and top (or an upper area) a section that faces upwards (or would come into contact with the child's head when it bends forwards or is pushed forward or accelerated). Instead of front (or a front area), one can also speak of outside (or an outer area). Instead of rear (or a rear area), one can also speak of inside (or an inner area). The respective area preferably ends halfway in a direction from bottom to top (or vice versa) or rear to front (or vice versa) (preferably at 30%, more preferably 20%, of this distance).

According to the third aspect of the invention, the gas generator is preferably arranged in an interior of the gas bag (i.e. in particular enveloped by the latter). Alternatively, the gas generator is to be arranged on an underside and/or front side of the gas bag (but not in an interior of the gas bag). Alternatively or additionally, at least one gas outlet opening into the gas bag can be arranged in a lower and/or front area of the gas bag. With such an arrangement of the gas generator or gas outlet, a safe operation of the airbag is enabled in a simple manner. In the prior art, it is sometimes disadvantageous that the gas generator is either located in a critical area (e.g. on the upper side of the impact shield, on which possibly the child's head lies) or that feeding must take place, which is complex and can be susceptible to damage and time delays.

According to execution, the gas generator is arranged (in particular not even partially) on an upper side and/or (in particular not even partially) on a rear side of the gas bag. Alternatively or additionally, a (the) gas inlet opening into the gas bag is not (not even partially) arranged in an upper area ( ) and/or not (not even partially) in a lower area of the gas bag. This can further improve safety.

According to a furthering aspect (which possibly may also exclusively be associated with features of the first and/or second and/or fourth and/or fifth and/or sixth and/or seventh aspect, without necessarily also the features of the third aspect), the gas generator (in the state of use of the impact shield) is arranged to extend horizontally and/or transversely to the direction of travel. Under the respective extension is to be understood that the gas generator initially has a preferred direction due to its geometry (for example a longitudinal direction, for example in the case of a cigar-shaped design). In general, extension can be understood as the direction of a "length" of the gas generator, whereby the length can in turn be understood as the distance between the pair of points with the maximum possible distance between all pairs of points of the gas generator. In general, a vertical alignment of the gas generator is also possible as an alternative (e.g., if the dimensions of the impact shield allow this).

By the selected positioning, in particular, a synergistic interaction with an airbag (beaten) arranged (around) the impact shield can be achieved. Firstly, the airbag can be inflated in the area of the thighs and pelvis (by which in particular a clamping of the child to prevent submarining or slipping-through results), then the airbag can be inflated on the upper side of the impact shield (and thus catch the child's head in a safe manner). Also, the guiding device (in particular the at least one channel) according to the second aspect can act advantageously in this context in order to guide the gas flow in the right (or desired) direction and/or to reduce turbulences (whereby an inflation as fast as possible can be achieved). The guiding device can then preferably have at least one channel running from bottom to top, in particular in a rear area of the impact shield. Finally, the following fourth aspect can also further improve this solution.

D. Overpressure Protection

According to a fourth independent aspect of the invention, the above object is solved in particular by a child restraint device (preferably child seat and/or impact shield) for mounting in a vehicle (or a component of such a vehicle), preferably according to the first and/or second and/or third aspect, comprising at least one airbag with at least one inflatable gas bag (and at least one gas generator), wherein the airbag is transferable from a non-inflated state to an inflated state, wherein at least one pressure-limiting device is associated with the gas bag (in particular as a component of the gas bag) such that when a predetermined pressure is reached or exceeded at least locally, a pressure relief by gas flowing out of the gas bag occurs.

In connection with the fourth aspect, it was recognised that an (possibly uncontrolled) inflation of the gas bag can sometimes also be dangerous for the child (namely in particular if the child already occupies parts of the space intended for the fully inflated gas bag). To a certain extent, the airbag can evade, but beyond that, pressures and/or forces and/or accelerations that are dangerous to the child can take effect. One possible scenario considered by the inventors is an impact of the head on the airbag when the latter is not yet fully inflated (for example in the case of a forward-facing seat and a head-on collision or rear-end collision). The head could then not only be decelerated, but even accelerated in a rearward direction, which would lead to particularly critical accelerations overall. The term acceleration here should also include deceleration in the physical sense, i.e. negative accelerations. This can be prevented, at least in part, by a comparatively early detection of the impact and/or rapid ignition or a rapid filling of the gas bag. An "out of position" detection, for example if the child is already resting on the impact shield with his head before the accident, can also be helpful. However, another significant scenario can occur if the airbag is also directed towards the pelvic area and the gas bag is inflated so that the child's abdomen (possibly due to the accident) already very closely abuts on the impact shield and is additionally accelerated further in this direction (due to inertia). Then, an inflation of the airbag at high pressure in this area can injure the child's sensitive abdomen. For this second case in particular, the solutions in the prior art are inadequate.

According to the invention, according to the fourth aspect, an overpressure protection (or pressure limiting device) is therefore proposed, which is preferably located between the gas generator and a sensitive area (abdomen and/or head) of the child and which allows gas to escape from the gas bag into the surroundings when a predefined pressure is exceeded. Preferably, the pressure limiting device is configured such that the pressure relief in the case of triggering takes place at least (or exclusively) in a lower and/or rear area of the gas bag and/or at a (lateral) edge of the gas bag (for example, at a left and/or right edge of the gas bag). Particularly preferably, the pressure limiting device is configured such that it is arranged in an area in which no guiding device or at least no channel (of a guiding device) is formed.

In embodiments, the pressure limiting device can be arranged in the vicinity of a (the) gas outlet opening into the gas bag and/or at the same (vertical) height as the gas outlet (in the state of use of the child restraint device).

The pressure limiting device (pressure relief) can comprise at least one predetermined breaking point and/or predetermined tearing point, preferably a tear seam, and/or at least one valve.

The predetermined pressure can be at least 1 bar, preferably at least 3 bar, and/or at most 50 bar, preferably at most 25 bar.

E. Softgoods

According to a fifth independent aspect of the invention, for solving the above object in particular a child restraint device, preferably an impact shield or child seat comprising such, for mounting in a (motor) vehicle (or a component of such a device) is proposed, preferably according to the first and/or second and/or third and/or fourth aspect, comprising at least one airbag with at least one inflatable gas bag (and at least one gas generator) and at least one first, in particular inner, mantle surrounding the gas bag, which mantle is firmly connected to a main body of the impact shield and/or envelops the gas bag in such a way that the latter is inaccessible.

According to the fifth aspect of the invention, the (entire) impact shield or predominant parts thereof, in particular in any case including the gas bag and gas generator, can be surrounded by a (preferably washable) inner mantle which is attached to the impact shield in such a way that a (non-destructive) opening or removal of the inner mantle by the user is not possible.

Around the inner mantle, according to execution, an outer mantle is arranged, which may be elastic and/or can be removed from the main body of the impact shield by triggering the airbag and/or is preferably detachably connected to the main body of the impact shield (directly or indirectly via the inner mantle).

The inner mantle is preferably elastic (at least in sections). The inner mantle may alternatively or additionally have at least one predetermined breaking point and/or at least one predetermined tearing point such that the inner mantle breaks open or tears open when the airbag is triggered.

According to execution, the inner mantle can cover at least one upper, rear and underside of the main body of the impact shield (at least in sections, possibly completely), preferably surrounding it like a bag. The rear side should be understood as the side facing the child.

In case of not-triggered airbag, an internal volume of the inner mantle can be smaller than (preferably at most 0.5 times as large as) an internal volume of the gas bag in the triggered state of the airbag.

The inner mantle can consist of a flexible material, in particular a textile (such as fabric). If necessary, the inner mantle can abut (comparatively) closely on the impact shield (for example, be spaced apart from the impact shield or the main body of the impact shield with an extension in any spatial direction of at most 3 cm or at most 1 cm). The inner mantle can, for example, have tear seams or other structurally weakened zones as predetermined tear points, which tear open when a predefined load is exceeded and allow the gas bag to be inflated. The predetermined tear points can be located in particular on an upper side of the impact shield or on the edges of the upper side.

According to execution, the inner mantle is surrounded by the (further) outer mantle, which can be removable and/or washable. The outer mantle can correspond to a (normal) cover of the impact shield (and can, for example, be formed of fabric, possibly with a foam component).

The outer mantle (or the cover) can, for example, be fastened in such a way that some (possibly thickened) edges are held in grooves or gaps of the impact shield and, when the inner mantle opens (in particular tears at the predetermined tear points), are pulled out of these grooves or gaps (and thus also do not hinder the inflation of the gas bag).

Specifically, the impact shield can have a front (first) section of (in particular hard) plastic, on which attachment points of the impact shield are present for an attachment to a main body of the child seat. The first or front section can preferably have a belt guide for a belt for attaching the impact shield to the main body of the child seat. This section is preferably surrounded at least to the rear and to the bottom by a second section of foamed polymer, possibly also to the top.

The second section can be completely surrounded by the inner mantle, or at least in the areas that are not covered by the first section. The grooves or gaps can be provided in the first section or can be formed between the first and second sections by their joining together.

The outer mantle can be placed around the second section like a sack so that (in the opening of the sack) the first section remains largely visible.

In principle, it is also conceivable that the outer mantle does not open (is blown off), but also has weak points such as predetermined tear points (tear seams) or is sufficiently elastic. A cover or flap (closed with Velcro, for example) is also possible. In general, the predetermined tear point can be a section that can be re-assembled (without repair measures, such as stitching) or a structure that cannot be re-assembled (without a repair with the aid of external means).

Particularly preferred is an elastically formed outer mantle, which is preferably such that it does not tear when the airbag is triggered.

F. Top, Bottom and Rear Gas Bag

According to a sixth independent aspect of the invention, a child restraint device, in particular child seat and/or impact shield, for mounting in a vehicle, or component of such a device, is proposed for solving the above object (preferably according to the first and/or second and/or third and/or fourth and/or fifth aspect), comprising at least one airbag with at least one inflatable gas bag (and at least one gas generator), wherein the gas bag at least in sections, preferably completely, in particular at least in the inflated state (optionally also in the non-inflated state), covers: an upper side, a underside and a rear side (when in use facing the child) of a (the) impact shield.

Preferably, the gas bag is placed around the impact shield in a U-shape. According to execution, the gas bag at least in sections, preferably completely, in particular at least in the inflated state and/or in the non-inflated state should not cover: a front side (when in use facing away from the child) of the impact shield.

G. Coupling Means

According to a seventh independent aspect of the invention, a child restraint device, in particular a child seat and/or impact shield, for mounting in a vehicle, or component of such a device, for solving the above object is proposed (preferably according to the first and/or second and/or third and/or fourth and/or fifth and/or sixth aspect), comprising at least one airbag with at least one inflatable gas bag, wherein the gas bag has at least one coupling means (hereinafter also: "release coupling means"), in particular a second coupling means, for coupling the gas bag to the child restraint device and is transferable from a non-inflated state to an inflated state, wherein the at least one, in particular second, coupling means is designed to release the coupling upon exceeding a predetermined force threshold.

By this allows it can be achieved that the gas bag is inflated further or faster, at least in sections, in the direction of thickness in the case the force threshold is exceeded, which is particularly advantageous if by this the child's head is especially protected. At the same time, the gas bag can preferably be layed-out comparatively widely before triggering, so that less installation space is required, and/or the airbag can be held securely in the intended position before triggering.

Preferably, the release coupling means is remote from a gas inlet, in particular further away than at least one further (first) coupling means.

Particularly preferably, the at least one second coupling means is located at or close to an upper front end of the support device (or the impact shield).

At least one first (the at least one first) coupling means is preferably designed differently from the release coupling means, in particular in such a way that it does not (or does not already) tear upon exceeding the predetermined force threshold. According to execution, the at least one first coupling means can be formed by the/one gas generator.

Preferably, a release is made possible in that a structurally weakened point is provided. This may be a taper and/or a perforation. According to execution, other or additional possibilities are also conceivable, e.g., frictional connections and/or press studs and/or other detachable fastenings.

In general, the (release) coupling means can be destroyed (upon exceeding the force threshold), as the child seat should possibly no longer be used after the airbag has been triggered anyways. Alternatively, the (release) actuating means can also remain intact (upon exceeding the force threshold).

The force can preferably be a tensile force that acts on the coupling means through the gas bag, in particular when the gas bag is inflated. The direction of the force can preferably be along the impact shield or perpendicular away from the impact shield or a combination thereof.

In a specific execution, the airbag remains coupled to the impact shield by at least one (in particular the first) coupling means, which is preferably located closer to the gas inlet (upon exceeding the force threshold).

Alternatively or additionally, the gas bag itself can be manufactured in such a way that it can be inflated less thickly in the direction of the thighs and/or the abdomen of a child located in the child seat (i.e. in a direction away from the impact shield) than in the direction of an expected impact of the head. Finally, when the gas bag is inflated a counterforce from the thighs and abdomen acts on the gas bag. In sum, the gas bag when inflated thus remains comparatively thin in the area of thighs and abdomen, whereas it can become thicker in the head area, and thereby retract from the side of the impact shield facing away from the child. By this the head can be caught earlier in the event of an accident and the risk of injury to the child is reduced.

H. General

By the various aspects of the invention (individually, but especially in combination) it is achieved (even in the case of more complicated geometries, for example an airbag which is placed in a U-shape around an impact shield) that the airbag or its gas bag inflates completely before a contact with the child occurs. In particular, by this it is avoided in a simple that the airbag ruptures unintentionally or at least ruptures in a predefined manner (according to the fourth aspect of the invention).

In particular, it can also be achieved that the airbag is only triggered in an accident situation.

Further embodiments are explained below, each of which can be combined with the first and/or second and/or third and/or fourth and/or fifth and/or sixth and/or seventh aspect of the invention and further promote the objectives of the invention.

I. Proportions/Extent Gas Bag

According to execution, a projection of the at least one gas bag onto an associated attachment area of the gas bag in the non-inflated state may be at least 0.5 times, preferably at least 0.8 times, still further preferably at least 0.9 times and/or at most 1.5 times, preferably at most 1.2 times as large as in the inflated state.

In the inflated state, the at least one gas bag can have a thickness of at most 20 cm, preferably at most 10 cm and/or at least 1 cm, preferably 2 cm. A thickness is to be understood as a (maximum) extent of the gas bag in a direction perpendicular to the corresponding fastening area for the gas bag.

Alternatively or additionally, the gas bag can be formed at least substantially flat, in particular have a thickness that is smaller than an extent in at least one direction perpendicular to a thickness direction.

Alternatively or additionally, a point furthest away from the rest of the child restraint device or its component may be at a distance of at most 20 cm, preferably at most 10 cm (in the inflated state).

The at least one gas bag can have an internal volume (in the deflated state) of at most 20 litres, preferably at most 12 litres, and/or at least 1 litre, preferably at least 3 litres.

The gas bag has an outer surface and an inner surface, wherein in the non-inflated state of the gas bag (at least almost) each section of the inner surface is in direct contact with (or at least very close to) another section of the inner surface.

Preferably, an inner volume of the gas bag in the non-inflated state is (significantly) smaller than in the inflated state or is at most 10%, preferably at most 5% of the volume in the inflated state.

II. Fastening/Arrangement Gas Bag:

Preferably, the gas bag has at least one connecting device for connecting the gas bag to a (the) support device.

According to execution, at least one (the at least one) gas bag can be attached to a seat area underside and/or at least one gas bag can be attached to a base underside of a base of the child seat to which the main body is attached.

At least one (the at least one) gas bag can be detachably fastenable or fastened or non-detachably fastened.

Furthermore, at least one gas bag (the at least one gas bag) can be attached in a (with respect to the direction of travel) front area of the child seat, in particular in a (with respect to the direction of travel) front area of the underside of the seat area or the underside of the base.

In one embodiment of the invention (in particular comprising at least the first aspect), the child restraint device is designed as a child seat with a main body that has a seat section which can rest (via an underside) on a seat section of a vehicle seat. Preferably, the child seat does not have a support foot. Further preferably, the child seat comprises an impact shield. In the embodiment, the child seat may further comprise a backrest with or without side wings, a headrest and/or a top tether. The seat section comprises an airbag on an underside (preferably in the front area thereof in relation to the direction of travel), wherein the gas bag of the airbag is preferably (at least substantially) non-folded in the non-inflated state. Particularly preferably, the gas bag flatly abuts on the underside of the seat section and is enlarged during inflation, at least in terms of a thickness, in order to counteract as far as possible any pressing of the seat section into a upholstery of the motor vehicle seat (e.g. in the event of a rear-end collision). The gas bag can have a volume of less than 12 litres, preferably less than 8 litres.

In a further embodiment (preferably comprising at least the features of the first aspect), a base for a child seat is proposed as a component of the child restraint device, wherein the base (in use) is intended to rest with an underside on a motor vehicle seat section. Preferably, the base does not have a support foot. The base may have an airbag on an underside (preferably in a front section with respect to a direction of travel), wherein a gas bag of the airbag in the non-inflated state is preferably at least substantially non-folded. In a preferred embodiment, the gas bag (at least substantially) flatly abuts on the underside of the base and is inflated (at least or at least substantially only) in the thickness direction upon triggering, in order to counteract an immersion of the base in an upholstery of the motor vehicle seat in the event of an impact. The gas bag here can have a volume of less than 12 litres, preferably less than 8 litres.

In a further embodiment (preferably comprising at least the features of the first aspect), the child seat may have a main body that has at least one seat section which is configured to, with an underside, abut on the vehicle seat section or on a base. The child seat may comprise an impact shield. Preferably, the child seat or its main body further has a backrest. The child seat can have further elements, such as side wings, a headrest, a support foot, a base and/or further elements. The impact shield may have a right impact shield section and a left impact shield section which are adapted to be attached to a right side of the seat section and a left side of the seat section when the child seat is in a use configuration. The impact shield may further have a centre (central) impact shield section that connects the right impact shield section and the left impact shield section, such that a first gap is formed between the centre impact shield section and a centre of the seat section when the child seat is in a use configuration. When the main body comprises a backrest, a second gap is preferably formed between the centre impact shield section and a centre of the backrest (in a use configuration of the child seat). The first gap (and if present, the second gap) is dimensioned such that the child can be accommodated in the child seat wherein the child's thighs extend at least partially through the first gap and wherein the child's abdomen and/or the child's chest preferably extend at least partially through the second gap. While the child extends at least partially through the gap(s), it may occur that the child's body does completely fill the gap(s) (in case of a sudden acceleration), which may result in some forward movement and/or submarining (submerging of the child). The impact shield therefore preferably extends in a transverse direction of the child seat. The gas bag is preferably attached to a support device, wherein the support device can be the child seat or a component thereof, for example the seat section of the child seat or an impact shield of the child seat or a backrest of the child seat or a component of one of these elements or components. Other parts of the child seat can also be considered. The gas bag may have a contact surface that is configured to come into (direct) contact with a person (in particular a child accommodated in the child seat) and/or a structure that is a different element from that with which the airbag is associated (for example, a structure of the vehicle in which the child seat is accommodated or another element of the child seat). This applies a force to the gas bag in the event of sudden acceleration. The gas bag may further have a support surface that is configured to be supported by the support device when the gas bag is inflated and the contact surface is subjected to a force. Contact surface and support surface are part of the outer surface of the gas bag. The gas bag can also have side surfaces that allow a distance between the contact surface and the support surface and/or define such a distance.

The airbag (in the inflated state of the airbag) may have at least sections that are at least substantially flat. This should preferably be understood to mean that, in such a section, the extent of the gas bag in at least a first direction is substantially narrower than the extent in at least a direction perpendicular to the first direction (for example, at most 50% thereof or at most 30% thereof).

The contact surface and/or support surface of the airbag may have an aspect ratio of more than 1, in particular more than 1.5 (for example 2 or more). The aspect ratio is the ratio of a first side (length) of the respective surface and a second side (width) of the respective surface. The guiding device (if provided) may be of particular advantage if the gas outlet of the gas generator and/or the gas inlet of the gas bag is arranged on (or close to) the shorter of the two sides of the support surface.

The gas bag may have a first coupling device which enables the gas bag to couple to the support device. The first coupling device may either be a (separate) element, attached to the gas bag, or may be formed integral with the gas bag. In embodiments, the first coupling device may, for example, have an adhesive or bonding.

In preferred embodiments, the first coupling device may be configured to cooperate with a second coupling device which is formed by (separate) devices and/or is provided by the support device (the support element).

First and second coupling devices may comprise, for example, a snap mechanism (e.g. press studs), a welting mechanism, a crimping mechanism, a riveting and/or bolts and/or screws. In particular, the gas bag may comprise holes that are configured to be prevented in connection with fastening devices, such as screws. The first coupling devices, in particular the holes, may be arranged in a "bulk area" of the support surface or at an edge border.

At least one wall of the gas bag can have an opening, in particular a hole (in particular if at least one guiding device and/or at least one coupling device is provided). In this case, the respective opening can be enclosed by a seam.

Openings and/or seams can be reinforced (in particular soaked) with a material in order to reduce a leakage. Such a sealing material can, for example, be a tape or a coating or similar.

When the airbag is triggered in the event of sudden acceleration, it may occur that the non-inflated or only partially inflated gas bag is acted upon with a force that acts against further inflation. In this case, it can be of particular advantage if the support device has a structure with at least one groove (in particular several grooves) which with correspondingly correspond to at least one channel (several channels) of the gas bag and, if necessary, has at least one web which is formed by the guiding device. In this way, a sufficient gas flow can be maintained, even if the pressure on the gas bag would otherwise prevent further inflation.

III. Impact Shield

The impact shield can be (conceptually) subdivided as follows. In particular, it should apply: Front (or the front area) describes a section that faces away (or is distant) from the child; rear (or the rear area) describes a section that faces the child (or on which a stomach/a chest of the child abuts); bottom (or a lower area) describes a section that faces the child's legs (or on which the child's legs abut); and top (or an upper area) describes a section that faces upwards (or would come into contact with the head of the child when it bends forward or is pushed forward or accelerated). Instead of front (or a front area), one can also speak of outside (or an outer area). Instead of rear (or a rear area), one can also speak of inside (or an inner area). The respective area preferably ends halfway in a direction from bottom to top (or vice versa) or rear to front (or vice versa) (preferably at 30%, more preferably 20%, of this distance), relative to the inflated and/or uninflated state, which condition(s) should apply to at least a state of use (e.g. tilt adjustment) of the impact shield, possibly to all states of use of the impact shield. If then, for example, an element is arranged in a lower area, this preferably means that this element is arranged in such a way that it does not exceed (upwards) the limit of 30% (used as an example) in at least one or every state of use (e.g. tilt adjustment) of the impact shield.

The impact shield and/or a central impact shield section thereof may have a bottom surface (lower surface), which is adapted to be directed towards the child's thighs (and the seat section), and an inner (rear) surface, which is adapted to be directed towards the child's abdomen and/or chest (and in the direction of the backrest of the child seat, if present, otherwise in the direction of a backrest of the vehicle seat).

The impact shield may preferably further comprise an upper surface opposite to the lower surface. The impact shield may further have an outer (front) surface opposite to the inner (rear) surface. Alternatively, the impact shield may comprise further surfaces which are directed away from the child (in the usual state of use), for example a surface which (directly) connects the bottom surface or lower surface and the inner surface.

The impact shield can have a gas bag of an airbag (in particular at least on a section of the lower surface, so that the gas bag counteracts a submarining due to inflation, and/or at least on a section of the inner surface, so that it counteracts forward movement of the child during inflation, and/or on at least a section of the upper surface and/or wrapped around the impact shield so that it covers at least sections of two adjacent or all three of the above-mentioned adjacent sides of the impact shield, wherein the gas bag is preferably substantially non-folded in the non-inflated state.

In a preferred further development, the gas bag preferably substantially flatly abuts on the impact shield (in particular on the central section of the impact shield) and is increased in view of its thickness (in the inflated state) in order to better retain the child (when the gas bag is arranged on the lower surface or bottom surface and/or the inner surface).

Alternatively or additionally, the gas bag is configured to cushion an impact of the child's head, in particular in a cushion-like manner (when the gas bag is arranged on the upper surface). The gas bag may rest on a section of the impact shield that is configured to act as a cushioning means (for example as an EPP or EPS part), wherein the impact shield further has an at least substantially solid or dimensionally stable section (for example as a moulded part). The gas bag can have a volume of less than 15 litres, preferably less than 10 litres.

Preferably, the impact shield comprises the gas generator of the airbag.

The gas generator may be arranged at or near the bottom surface or lower surface of the central section and/or remote from the inner surface of the central section (which is arranged in the central section or in the left or right section of the impact shield).

Preferably, the impact shield or at least a component thereof, in particular at least the surfaces on which the airbag is arranged, is covered with "softgoods", for example a textile covering or another suitable soft material, in order to give the impact shield a cushion-like shape and to improve the comfort.

Preferably, the impact shield can consist largely of a foamed polymer (EPS, EPP); if necessary, the impact shield (e.g. in the area of the belt guide) can be made in sections of a firmer material (plastic, e.g. PP). The gas generator can be arranged in a cavity of the impact shield, preferably in an area formed from foamed polymer. The cavity can be dimensioned in such a way that the gas generator is (also) held by clamping. Alternatively or additionally, a friction-locked holder can be provided.

Preferably, at least one gas bag is attached to the impact shield. Alternatively or additionally, the impact shield can be formed at least in sections from a soft, in particular foamed, material, such as EPS and/or EPP. Alternatively or additionally, the impact shield can be formed at least in sections from a harder, in particular non-foamed, material, in particular plastic, e.g. PP.

A (the) gas generator can be arranged in a receptacle, in particular at least partially formed from soft and/or foamed material, of an (the) impact shield and/or be fixed in a force-fit manner, in particular by a clamping mounting and/or a form-fit manner and/or a material-fit manner, or, alternatively, be loosely connected to the main body of the impact shield.

A (the) impact shield can have a left impact shield section, a right impact shield section and a centre (central) impact shield section located between the left and right impact shield sections, whereby at least one gas bag is preferably, in particular exclusively, attached to the centre impact shield section.

At least one gas bag (the at least one gas bag) can at least in sections, preferably completely, in particular at least in the inflated state, possibly also in the non-inflated state cover: an upper side and/or a underside and/or a side of a (the) impact shield facing, in use, the child; and/or at least in sections, preferably completely, in particular at least in the inflated state and/or in the non-inflated state not cover: a side of the impact shield facing, in use, away from the child.

IV Other

In embodiments, the child seat does not comprise a support foot (however, such a foot may be provided).

The gas generator is preferably a cold gas generator.

Further embodiments are apparent form the dependent claims.

Figure 2:
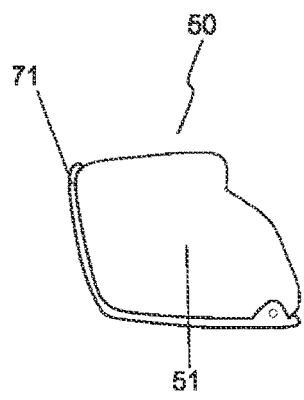
Figure 3:
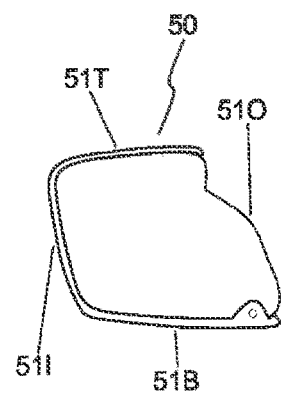
Figure 4:
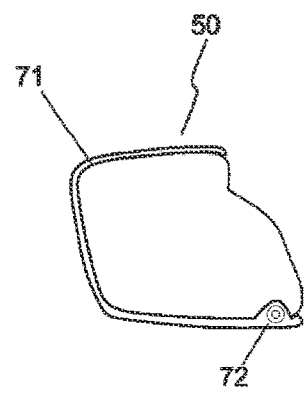
Figure 5:
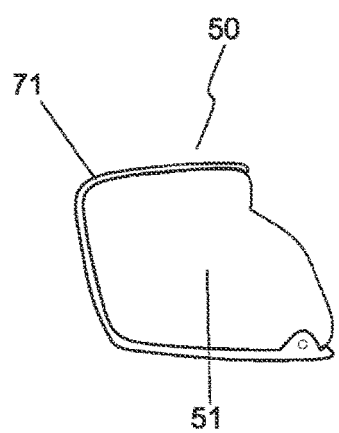
Figure 6:
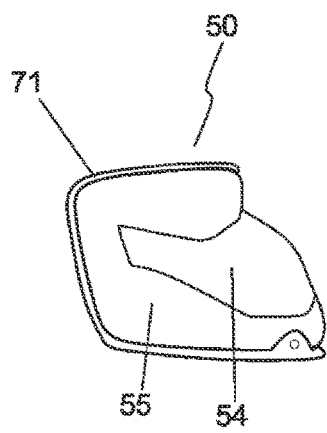
Figure 7:
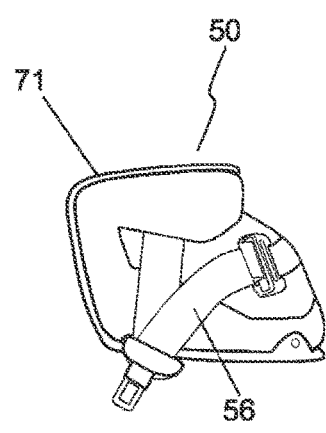
Figure 8:
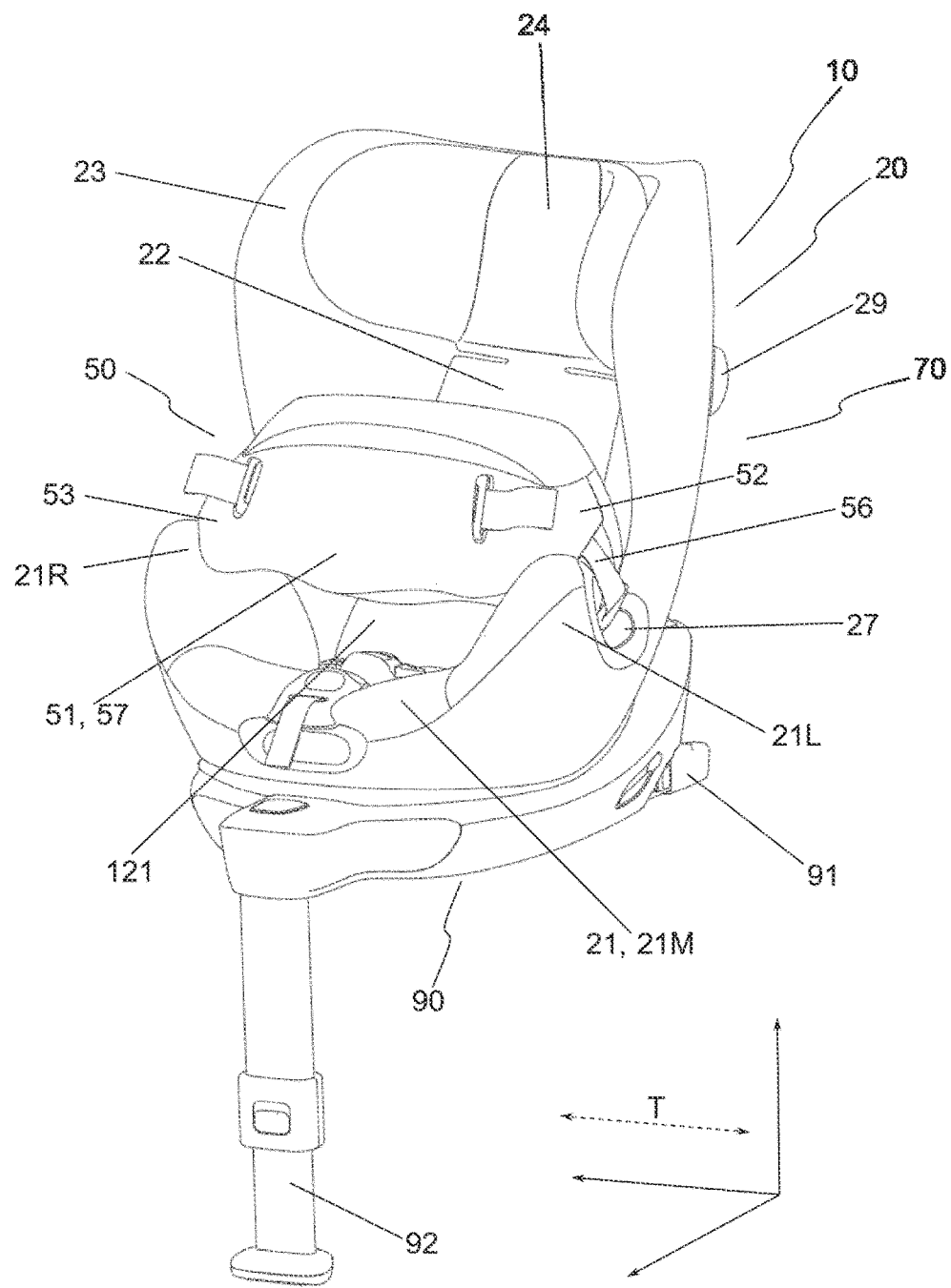
Figure 9:
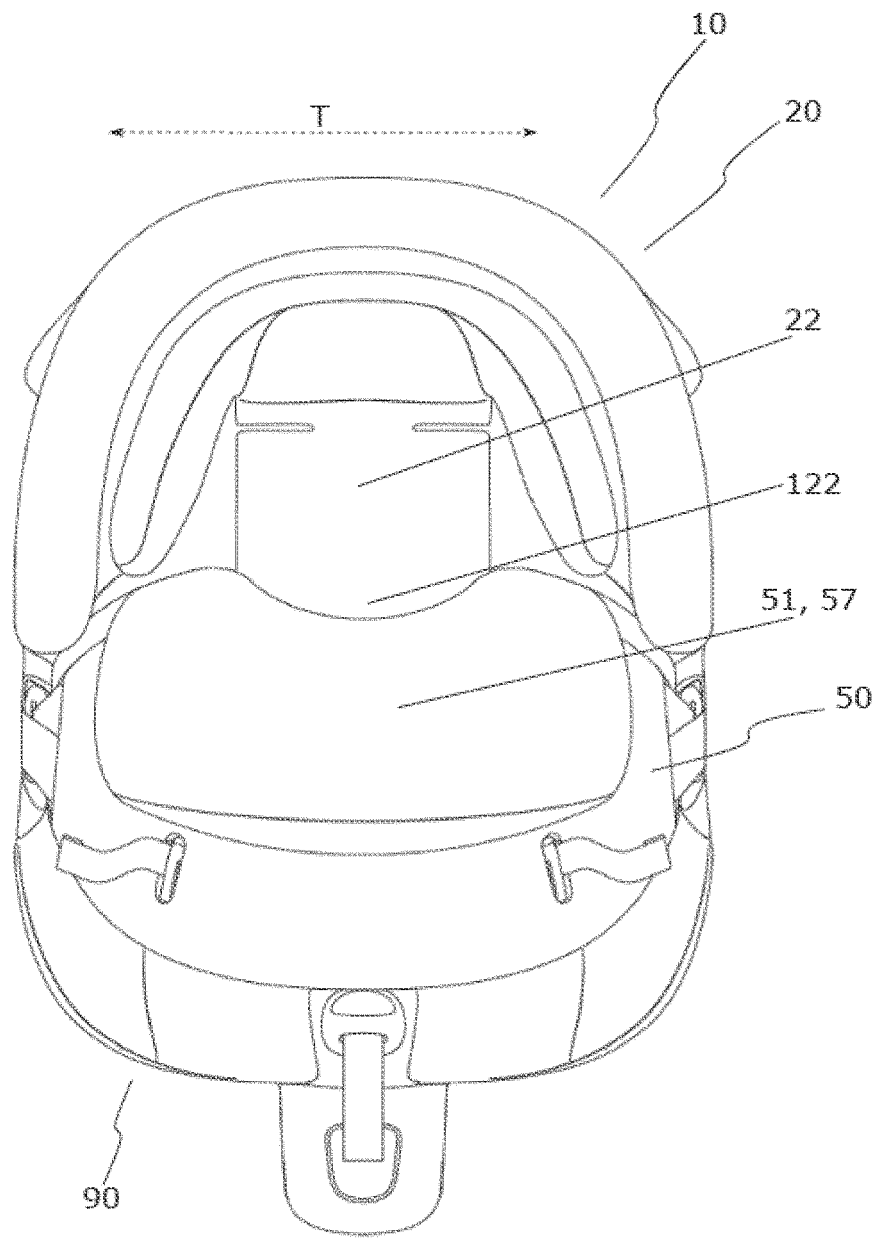
Figure 10:
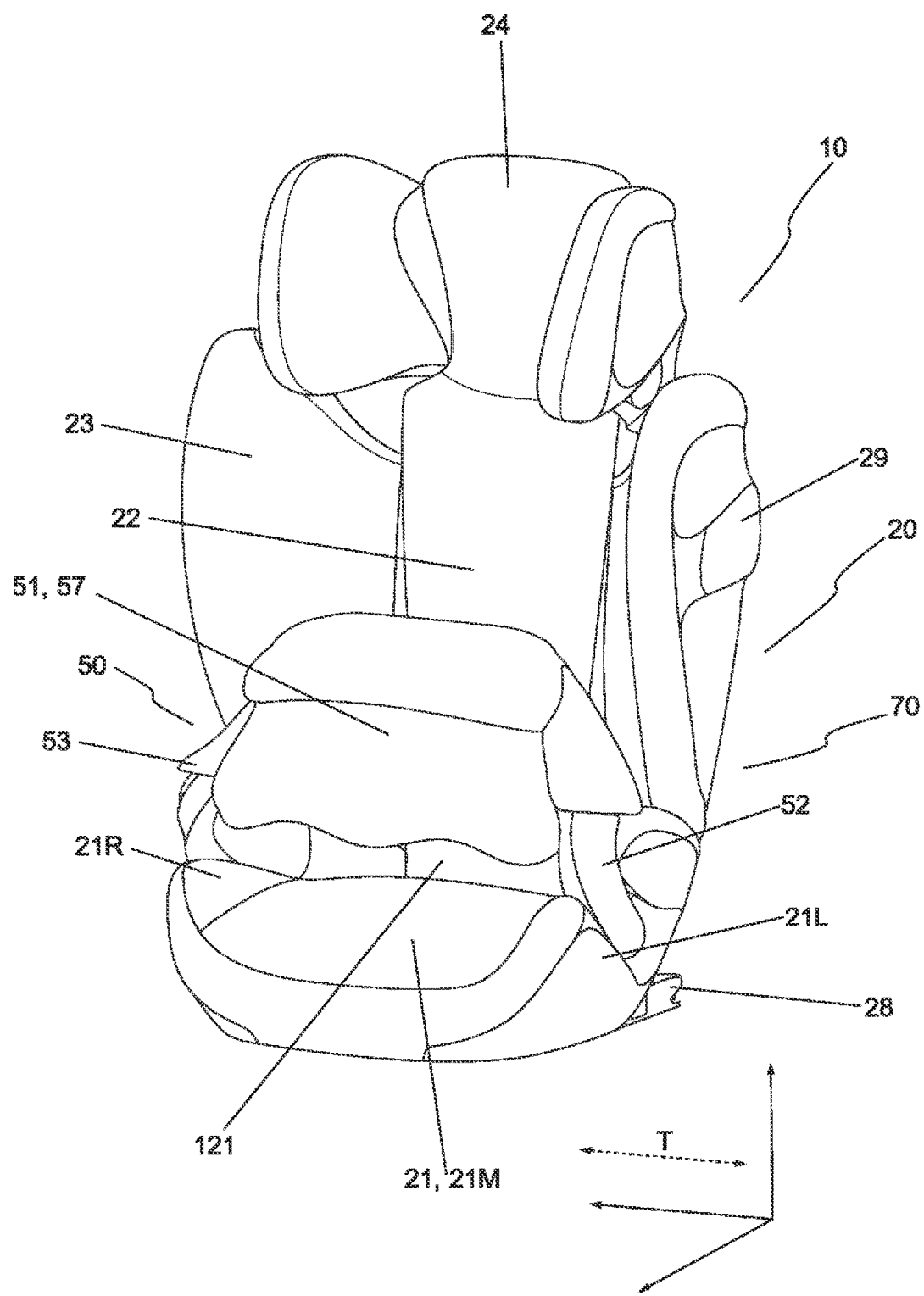
Figure 11:
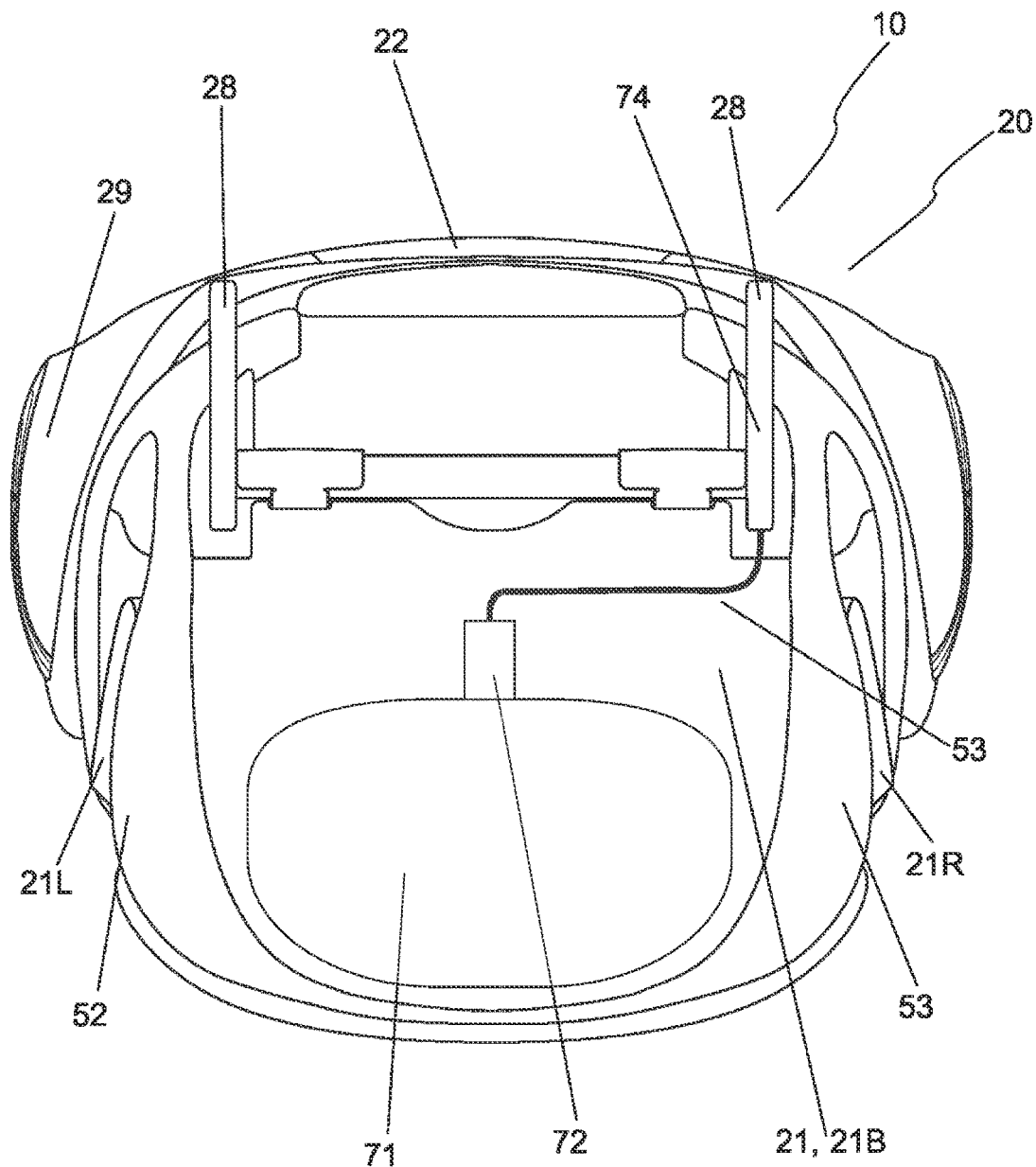
Figure 12:
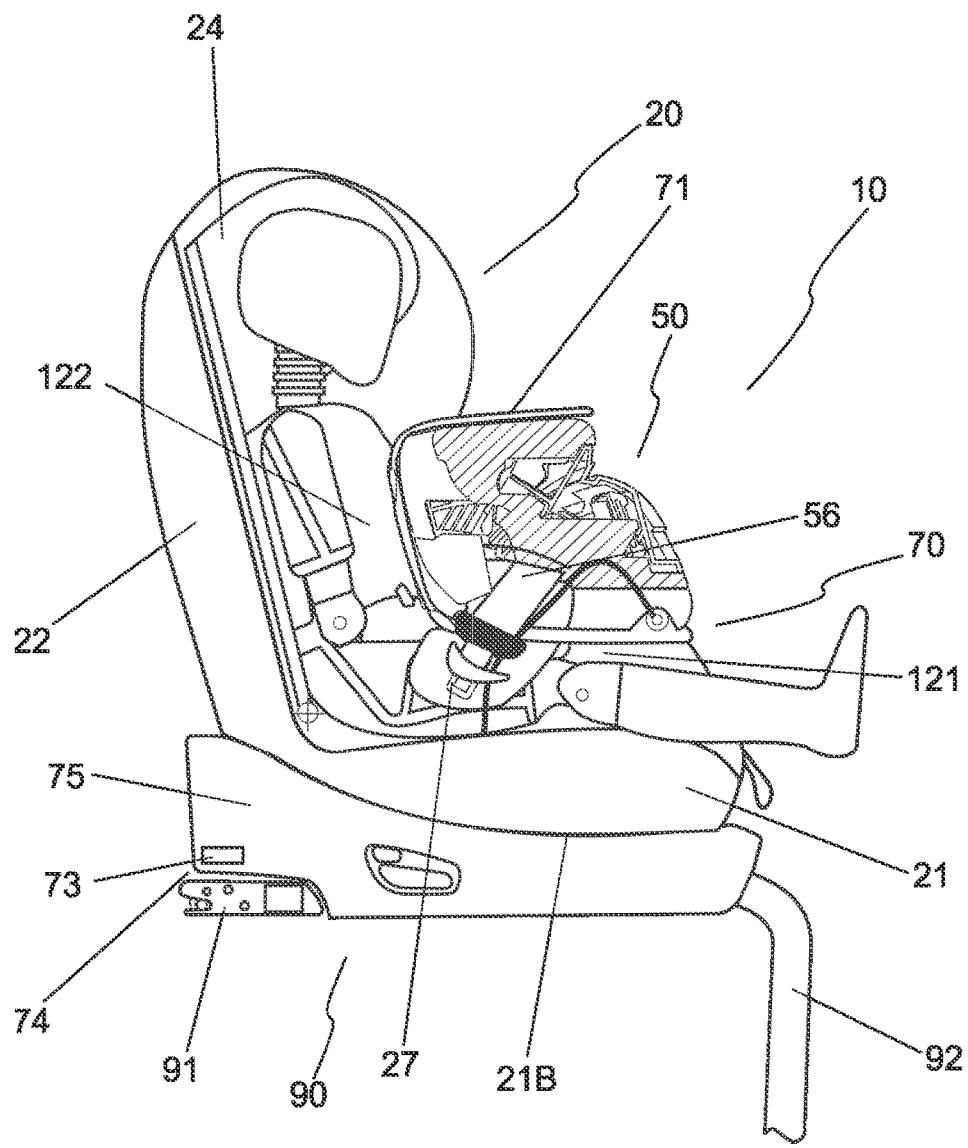
Figure 13:
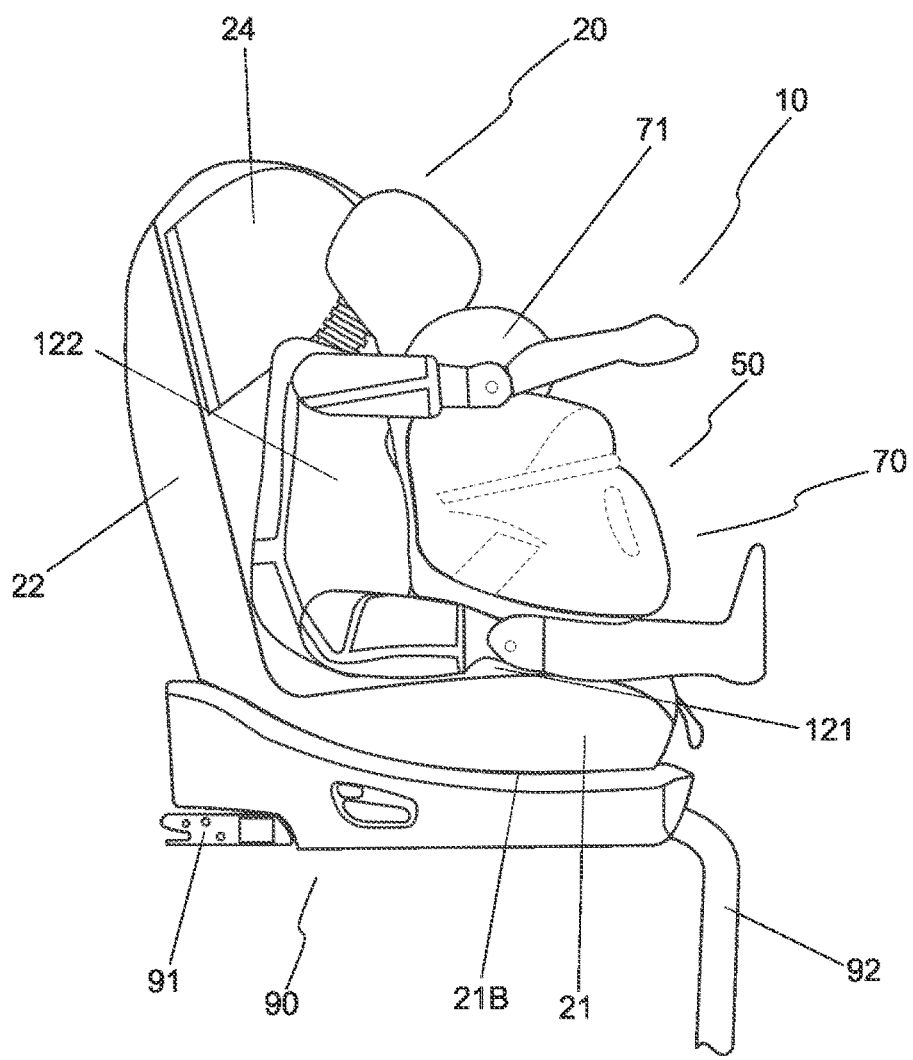
Figure 14:
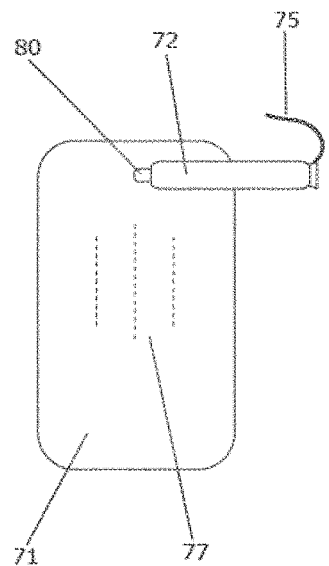
Figure 15:
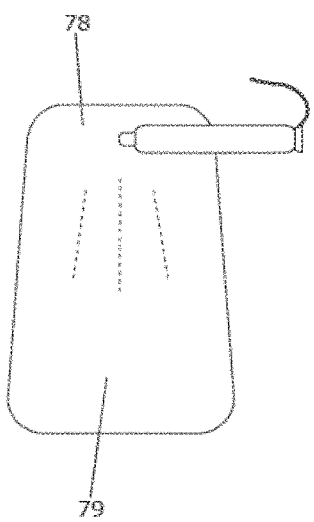
Figure 16:
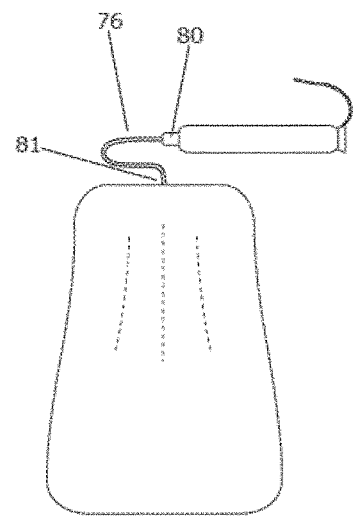
Figure 17:
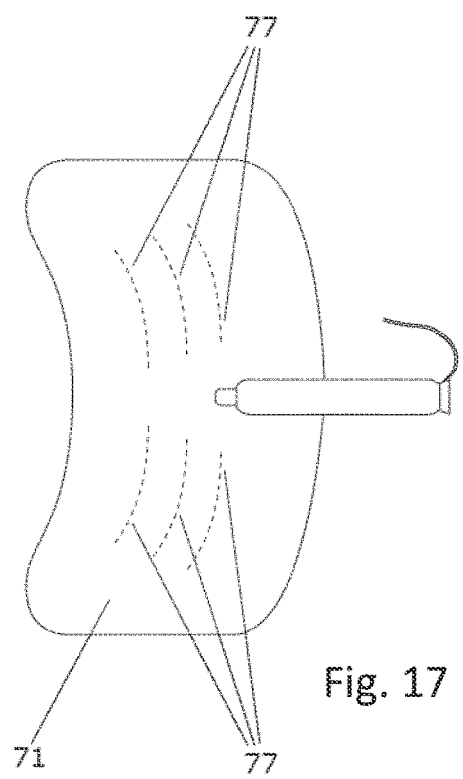
Figure 18:
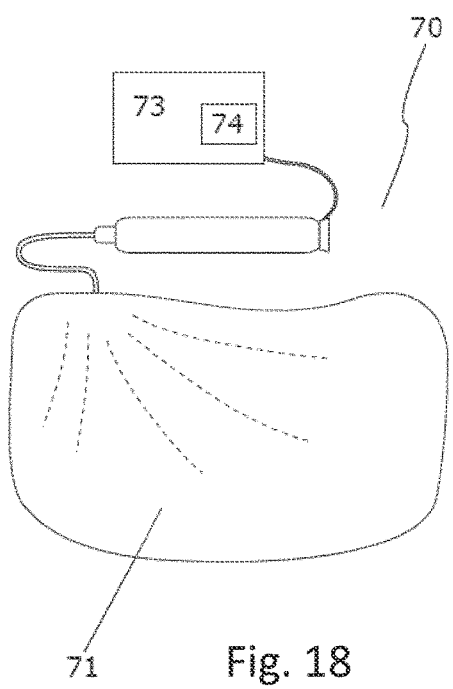
Figure 19:
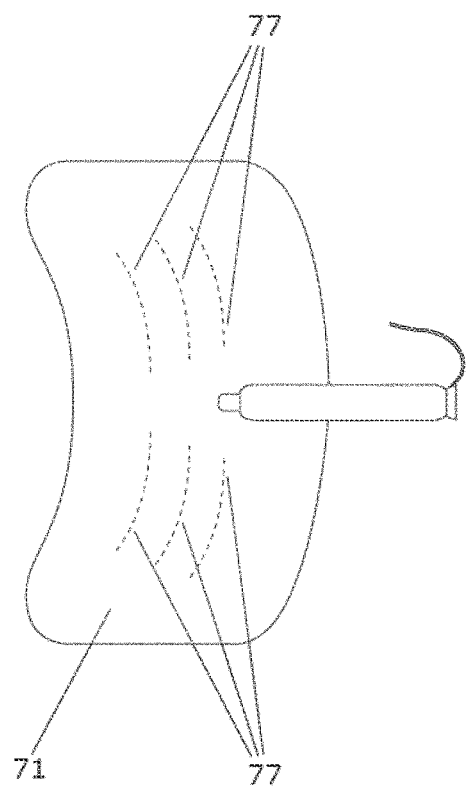
Figure 20:
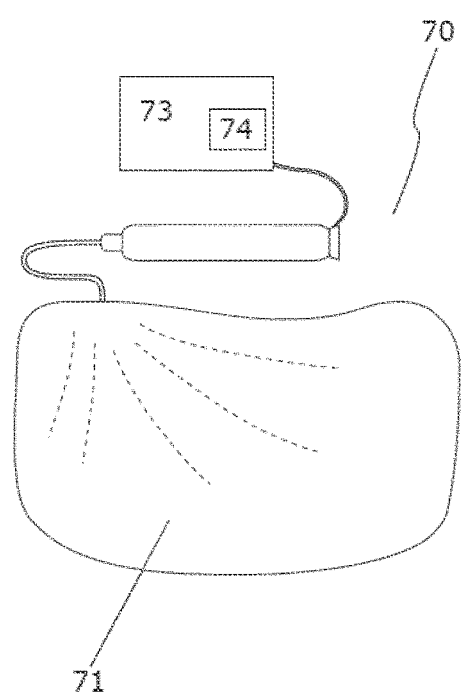
Figure 21:
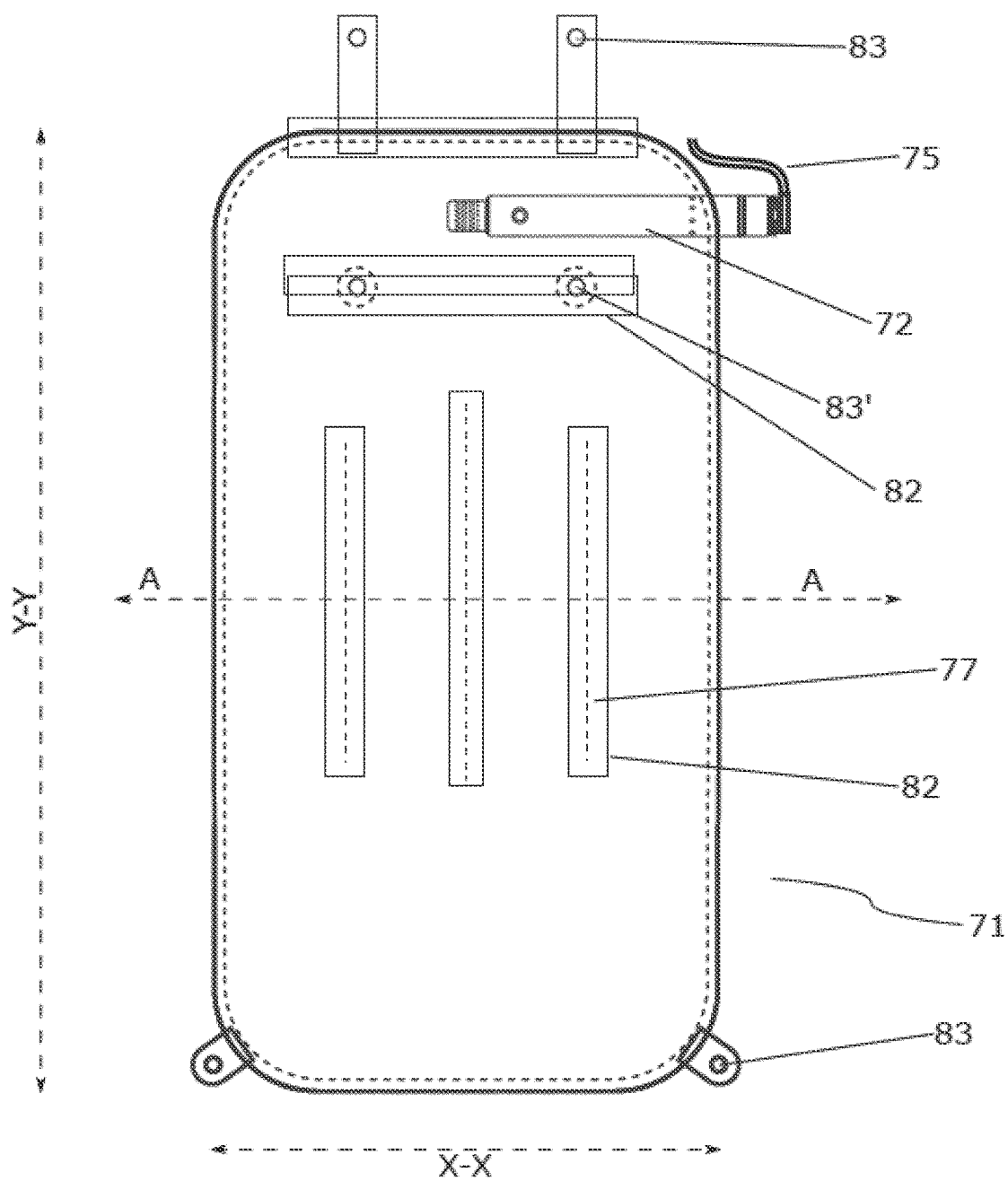
Figure 22:
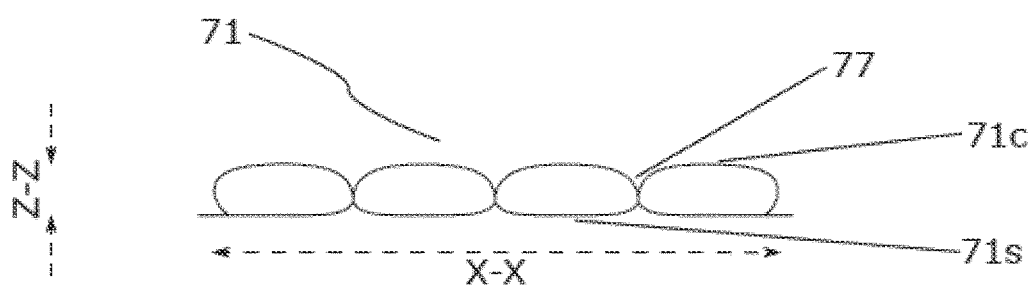
Figure 23:
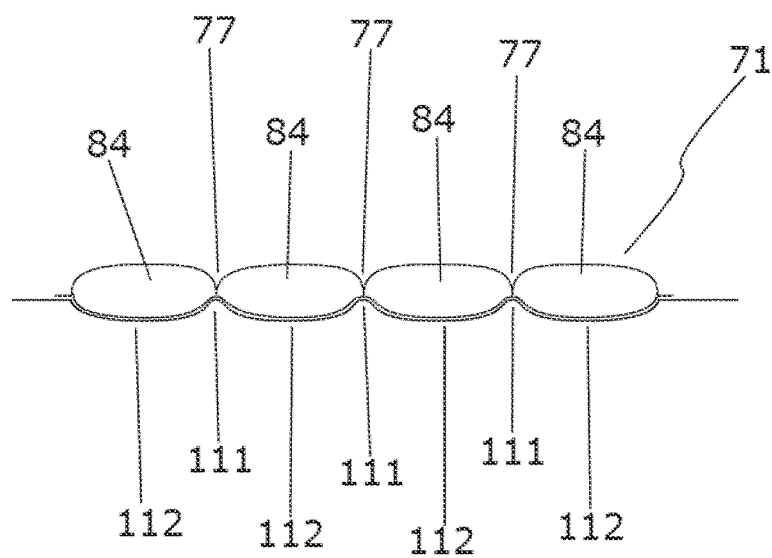
Figure 24:
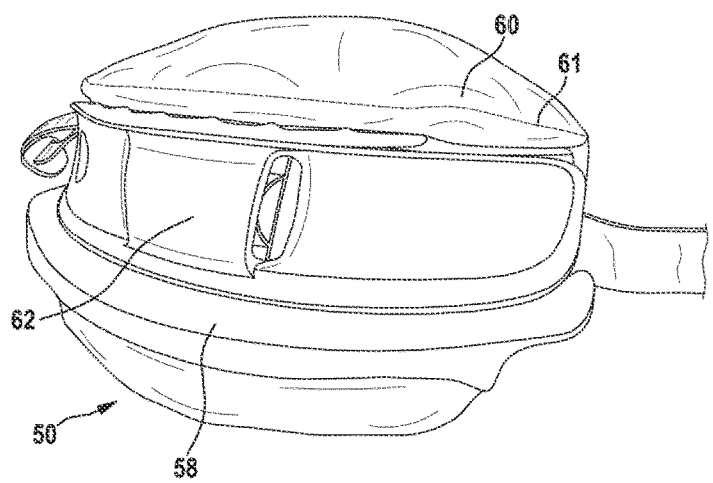
Figure 25:
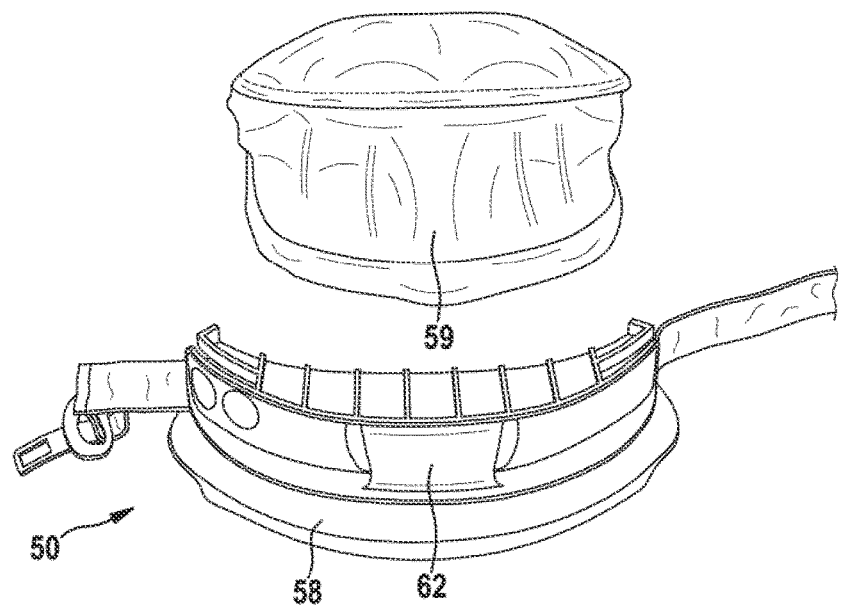
Figure 27:
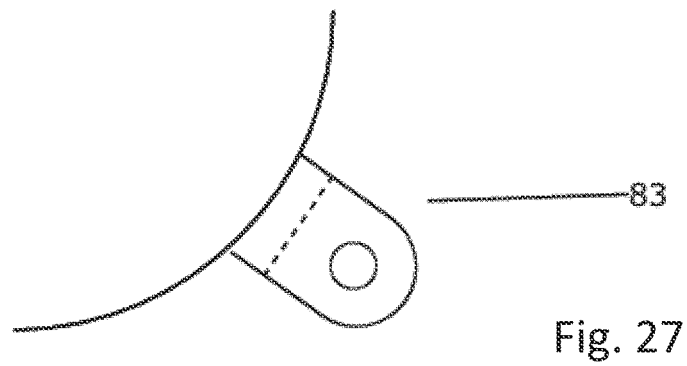
Figure 26:
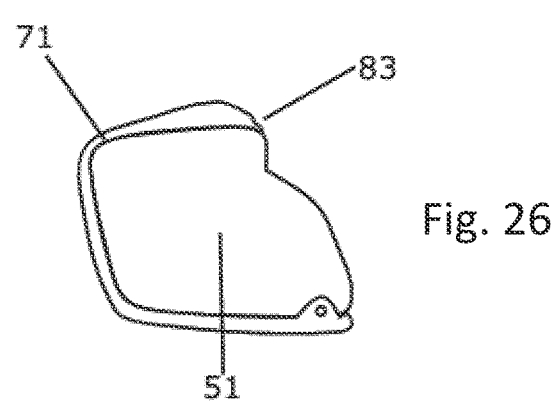

In the following, the invention is explained with reference to the figures also with regard to further features and advantages. Hereby show:

FIG. 1 a schematic representation of an airbag according to the prior art;

FIG. 2 a cross-section of an impact shield according to the invention;

FIG. 3 a cross-section analogous to FIG. 2 of a further embodiment of an impact shield according to the invention;

FIG. 4 an illustration analogous to FIG. 2 of a further embodiment of an impact shield according to the invention;

FIG. 5 an illustration analogous to FIG. 2 of a further embodiment of an impact shield according to the invention;

FIG. 6 an illustration analogous to FIG. 2 of a further embodiment of an impact shield according to the invention;

FIG. 7 an illustration analogous to FIG. 2 of a further embodiment of an impact shield according to the invention;

FIG. 8 an oblique view of a child seat according to the invention;

FIG. 9 a top view of the child seat according to FIG. 8;

FIG. 10 a further embodiment of a child seat according to the invention in an oblique view;

FIG. 11 the child seat according to FIG. 10 in a view from below;

FIG. 12 a child seat according to the invention, partially in cross-section, in a side view;

FIG. 13 the child seat according to FIG. 12 with inflated airbag;

FIG. 14 a schematic representation of a gas bag according to the invention with gas generator;

FIG. 15 a schematic representation of a further gas bag according to the invention with gas generator;

FIG. 16 a schematic representation of a further gas bag according to the invention with gas generator;

FIG. 17 a schematic representation of a gas bag according to the invention with gas generator;

FIG. 18 a schematic representation of a second gas bag according to the invention with gas generator;

FIG. 19 a schematic representation of a further gas bag according to the invention with gas generator;

FIG. 20 a schematic representation of a further embodiment according to the invention of the gas bag with gas generator;

FIG. 21 a schematic representation of a further embodiment according to the invention of a gas bag with gas generator;

FIG. 22 a schematic representation of a cross-section of the gas bag 71 according to FIG. 21;

FIG. 23 a schematic representation of a cross-section of the gas bag analogous to FIG. 22 according to a further embodiment;

FIG. 24 an oblique representation of an impact shield according to the invention;

FIG. 25 a representation of the impact shield according to FIG. 23, partially in exploded view;

FIG. 26 a schematic representation of a further embodiment according to the invention of a gas bag with gas generator;

FIG. 27 a detail of the embodiment according to FIG. 26; and

Figure 28:
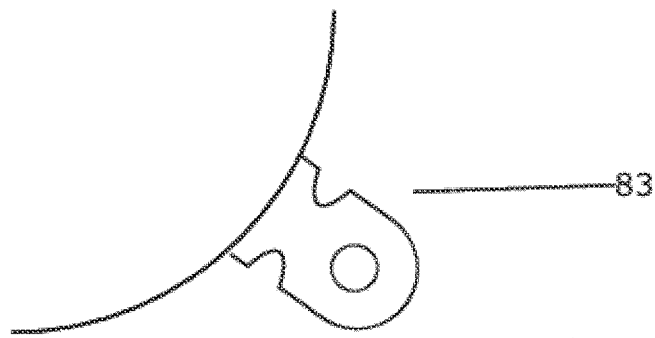

FIG. 28 a variant of the detail according to FIG. 27.

In the following description, the same reference numerals are used for identical and identically acting parts.

I. DESCRIPTION OF FIGURES

FIG. 1 is taken from U.S. Pat. No. 5,184,844 A (omitting the reference signs there) and shows an airbag, whereby large parts of the outer surface of a gas bag are in contact with other parts of the outer surface of the gas bag or at least very close to other parts of the outer surface of the bag (due to the schematic character of this figure, it ultimately remains open in the drawing whether the sections should actually touch each other, but this will presumably be the case in practice). The airbag shown here has pronounced folds.

FIG. 2 shows a cross-section of an impact shield 50 with a gas bag 71 of a non-inflated airbag. The gas bag is placed around a bottom surface 51B and an inner (rear) surface 51I of a central impact shield section 51. The gas bag has a gas inlet that allows the airbag to be filled with gas. The gas bag of this embodiment can have a volume of 2-7 litres, preferably 3-5 litres.

FIG. 3 shows a cross-section of an impact shield 50, wherein the central section 51 of the impact shield has an upper surface 51T, an inner (or rear) surface 51I, a bottom surface (or lower surface) 51B and an outer (or front) surface 51O.

FIG. 4 shows an impact shield 50 with a gas bag 71 of an airbag in the non-inflated state. The impact shield comprises a gas generator 72 that is configured to fill the gas bag 71 with gas in the event of an impact.

The gas bag of this embodiment can have a volume of 3-15 litres, preferably 5-9 litres.

FIG. 5 shows a cross-section of an impact shield 50 with gas bag 71 of an airbag in the non-inflated state. The gas bag is placed around the bottom surface or lower surface 51B, an inner (rear) surface 51I and an upper surface 51T of the central (middle) impact shield section 51. The gas bag has a gas inlet that allows the airbag to be filled with gas.

FIG. 6 shows the cross-section of an impact shield 50 with a gas bag 71 of an airbag in the non-inflated state, wherein the impact shield has an at least substantially solid section 54 and a (e.g., foamed) cushioning means 55.

FIG. 7 shows a cross-section of an impact shield 50 with a gas bag 71 of an airbag in the non-inflated state, wherein the impact shield has fastening means 56 to (detachably) fasten the impact shield to a child seat. The fastening means 56 may comprise a belt system (which may be adapted with regard to its length) and belt tongues which are configured to engage with a buckle of the child seat.

FIG. 8 shows a child seat 10 that has a main body 20, a base 90, an impact shield 50, and an airbag 70 (not shown in detail). The main body comprises a seat section 21 (having a centre section 21M, a left side 21L and a right side 21R), a backrest 22, side wings 23, a headrest 24, a first fastening means 27, a side impact protection 29, and a third fastening means 31 (not shown). The impact shield extends substantially in a transverse direction T and has a centre (central) section 51, a left section 52, a right section 53, sixth fastening means 56 and a cover 57. The base has a fifth fastening means 91, a fourth fastening means 93 (not shown) and a support foot 92. A gap 121 is formed between the central section 51 (in particular its bottom surface 51B, not visible in the figure) and the centre section 51M of the seat section 21.

FIG. 9 shows the child seat 10 of FIG. 8 in a view from above, wherein a second gap 122 is recognisable between the central section 51 (in particular its inner or rear surface 51I, not visible in the figure) and the backrest. The airbag may be implemented according to one of the embodiments which are shown in FIGS. 2-7.

FIG. 10 shows a child seat 10 that has a main body 20, an impact shield 50, and an airbag 70 (not shown in detail). The main body 20 comprises a seat section 21 (with a centre section 21M, a left side 21L and a right side 21R), a backrest 22, side wings (or side bolsters) 23, a headrest 24, a first fastening means 27, a side impact protection 29, and a second fastening means 28. The impact shield extends at least substantially in a transverse direction T and has a central section 51, left and right sections 52, 53, and a cover 57. A first gap 121 is formed between the central section 51 (in particular its bottom surface 51B, not visible in the figure) and a centre section 21 of the seat section.

FIG. 11 shows a child seat 10 according to FIG. 10 in a view from below, wherein an airbag 70 is provided with a gas bag 71 (in a front section of the bottom surface 21B of the seat section 21), a gas generator 72, a sensor 74 and a connection 75. The sensor 54 is part of a control system (or controller) 73, which is not shown in detail. An additional airbag may be provided in the impact shield according to one of the embodiments shown in FIGS. 2-7, or any other embodiment according to the invention. The gas bag of this embodiment may have a volume of less than 10 litres.

FIG. 12 shows a child seat 10 (partially in cross-section) that has a main body 20, a base 90, an impact shield 50 and an airbag 70. The main body comprises a seat section 21, a backrest 22, a headrest 24 and a first fastening means 27. The impact shield 50 extends (at least substantially) in a transverse direction T and comprises a sixth fastening means 56. The airbag 70 comprises a gas bag 71 placed around a central section 51 of the impact shield (such that a bottom surface 51B, an inner surface 51I and a top surface 50T are at least partially, possibly completely, covered by the gas bag 71 which abuts at least substantially flat against these surfaces), a gas generator 72 which is preferably arranged in a cavity of the impact shield and is connected to a controller 73 by a connection 75.

A first gap 121 extends between bottom surface 51B of the central section 51 of the impact shield and the seat section 21, wherein the gas generator 72 is arranged close to a front end of the first gap 121 (i.e. away from the abdomen of the child), for example at a front end of the bottom surface 50B and/or at a front end of the outer (front) surface 51O. A second gap 122 extends between inner (rear) surface 51 of the centre section 51 of the impact shield and the backrest 22. The first gap 121 and the second gap 122 are configured to receive the legs and the abdomen of the child and the child's chest, respectively. A first fastening means 27 and a sixth fastening means 56 are configured to cooperate such that the impact shield 50 is (fixedly) attached to the main body 20 and a child accommodated in the child seat is restrained. The base 90 comprises a support foot 92, a fifth fastening means 91 (in particular Isofix anchor) and a controller 73, wherein the controller 73 comprises a sensor 74 that is arranged in or near a fifth fastening means 91. An airbag 70 may be implemented according to FIG. 7 or, alternatively, according to any embodiment that is shown in FIGS. 2-6 or according to yet another embodiment of the invention.

FIG. 13 shows the child seat 10 of FIG. 12, wherein (now) the airbag 70 is in its inflated state. The gas bag 71 is filled with gas, so that first gap 121 and second gap 122 are (now) narrower in order to restrain the child from a (initial) movement forward relative to the child seat. A bulge in the surface of the upper surface 51 T is configured to receive the child's head. The gas bag of this embodiment may have a volume of at least 3 litres, preferably at least 5 litres, and/or a volume of less than 15 litres, preferably less than 10 litres.

FIG. 14 shows a schematic representation of a (rectangular) gas bag 71 and a gas generator 72. The gas generator 72 has a gas outlet 80, which is arranged inside the gas bag 71 close to its edge. The gas bag 71 comprises a guiding device 77 with (linear and/or linearly arranged) guiding structures which are arranged straight and parallel to each other. A connection 75 is provided on the gas generator 72 to connect the gas generator 72 to a controller (not shown).

FIG. 15 shows a schematic representation of a (trapezoidal) gas bag and a gas generator. The gas bag has a proximal section 78, close to the gas outlet of the gas generator, and a distal section 79, further away from the gas outlet, and has a guiding device with (preferably line-forming) guiding structures, which is straight and (slightly) divergent. A connection is provided on the gas generator to connect the gas generator to a controller (not shown).

FIG. 16 shows a schematic representation of a gas bag and a gas generator. The gas generator 70 has a gas outlet 80, which is connected to a gas inlet 81 of the gas bag via a gas connection 76. The gas bag has a guiding device with guiding structures (preferably forming lines) which are curved and diverge (slightly). A connection is provided on the gas generator to connect the gas generator to a controller (not shown).

FIG. 17 shows a schematic representation of a gas bag 71 and a gas generator. The gas generator has a gas outlet which is arranged inside the gas bag (near its centre). The gas bag has two guiding devices 77, each with a group of guiding structures (preferably forming lines) which are curved and parallel to the guiding devices 77 of the respective same group. A connection is provided on the gas generator to connect the gas generator to a controller (not shown).

FIG. 18 shows a schematic representation of an airbag 70 comprising a gas bag 71, a gas generator and a controller 73 with a sensor 74. The gas outlet of the gas generator is connected to a gas inlet of the airbag 71 via a gas connection. A connection is provided on the gas generator to connect the gas generator to the controller 73.

FIG. 19 shows a schematic representation of a (rectangular) gas bag and a gas generator 72. The gas generator has a gas outlet 80, which is arranged inside the gas bag (near its centre). The gas bag comprises two guiding devices 77, each having a group of guiding structures which are straight and parallel to each other. A connection 75 is provided on the gas generator to connect the gas generator to a controller (not shown).

FIG. 20 shows a schematic representation of a gas bag and a gas generator. The gas bag has a proximal section 78 close to a gas outlet of the gas generator, and a distal section 79 further away from the gas outlet. The gas bag has two guiding devices, each with a group of (preferably line-forming) guiding structures, which are straight and (slightly) diverging. A connection is provided on the gas generator to connect the gas generator to a controller (not shown).

FIG. 21 shows a schematic representation of a gas bag 71 and a gas generator 72. The gas bag 71 has short edges that extend in an X-X direction and long edges perpendicular to the short edges that extend in a Y-Y direction. The gas bag 41 further has a guiding device 77 with guiding structures which are straight and parallel to each other and which are covered by sealings 82. Furthermore, the gas bag 71 has coupling means 83 and 83' which are configured to couple the gas bag to a support element. The coupling means 83 are each provided on an associated protrusion of the gas bag 71 which protrusion projects from a section of the gas bag that is configured to be filled with gas. These protrusions may either be selected integral with one of the walls of the gas bag, or they may be attached to the (respective wall) as separate elements.

The coupling means 83' may be arranged in a contact surface 71c and a support surface 71s (as shown in the figure) or only in a support surface 71s of the airbag 71. The coupling means 83' may be covered by sealings, and be aligned with the guiding structures of the guiding device 77 to assist the guiding of the gas flow in a proximal-distal direction. A connection 75 is provided on the gas generator 72 to connect the gas generator 72 to the controller (not shown).

FIG. 22 shows a schematic representation of a cross-section of the gas bag 71 as shown in FIG. 21 along a dashed line A. While in FIG. 21 it is not recognisable whether the gas bag 71 is inflated or non-inflated, it is shown here in its inflated state. It can be seen that the gas bag is formed at least in the area of the section of the cross-section shown (at least essentially) flatly (this can also generally apply to all cross-sections not shown). The height of the gas bag extends in a direction Z-Z (which is perpendicular to the direction X-X and the direction Y-Y and is indicated by the distance of the two arrow heads) and is (considerably) smaller than a width that extends in direction X-X (here: less than 10%). It can further be seen that the guiding device 77 or its guiding structures contribute to limiting the height. The (e.g., flat) surface of the support element is not shown.

FIG. 23 shows a schematic representation of a cross-section of the gas bag 71 analogous to FIG. 22 along the dashed line A in an alternative embodiment to that shown in FIG. 22. Here too, the gas bag 71 is shown in its inflated state. The difference to FIG. 22 is that the surface of the support element is not flat, but has webs 111 and grooves 112 which are aligned with the structures of the guiding device 77 or with channels 84. Each channel 84 faces a groove 112, while each guiding structure of the guiding device faces a web 111. In this way, a sufficient gas flow can be ensured even when a certain pressure is exerted on the contact surface 71c of the gas bag 71.

FIG. 24 shows an oblique view of an impact shield according to the invention. The impact shield has a first (solid) section 58 as well as a second (softer) section 59, as well as an inner mantle 60. A gas bag (not visible) is accommodated within the inner mantle 60. The inner mantle 60 comprises tear seams 61 which are designed such that they tear open at a predetermined pressure so that the gas bag can inflate. In the first section 58A a belt guide 62 is arranged, through which a vehicle belt or a child seat belt can be passed in order to hold the impact shield (and thus the child).

An outer mantle or cover can be arranged around the inner mantle 60 (not shown in the figure).

The first section 58 is preferably made of a non-foamed plastic. The second section 59 is preferably made of a foamed plastic.

FIG. 26 shows a further embodiment of an impact shield according to the invention (in particular as component of a child seat).

The impact shield has a central impact shield section 51 as well as a gas bag 71. This can, in principle, be constructed as shown in FIG. 21 (although this is not mandatory), in particular with regard to the coupling means 83, 83' (with the specifics explained in the following).

In particular, the impact shield according to FIGS. 26-28 can have coupling means 83, which can, for example, be inserted at the place of the "lower", with reference to the drawing, coupling means shown in FIG. 21. Specifically (in relation to the impact shield), these coupling means 83 (see FIG. 26) can be coupling means which are arranged at the top of the impact shield in a front third of the impact shield, in particular at a front, upper end of the impact shield (or in the vicinity thereof, for example at most 2 cm or at most 4 cm or at most 5 cm away from such a front, upper end).

These (release) coupling means 83 can be designed as shown in FIG. 27, i.e. in particular have a (dashed-drawn) predetermined tearing point and/or predetermined breaking point, which tears or breaks when a predetermined force threshold is exceeded. This predetermined tear point and/or predetermined breaking point can, for example, have one or several (e.g. at least 2 or at least 3 or at least 5, in particular arranged in a line) perforation(s).

Alternatively or additionally, a taper (as in FIG. 28) can also be provided, which also defines a predetermined tear point and/or predetermined break point. In this respect, a combination of the solution shown in FIGS. 27 and 28 is also possible. Specifically (which is not mandatory), according to the embodiment shown in FIG. 28, a pair of mutually opposite tapers is provided (where the dashed line is drawn in FIG. 27).

The force threshold is preferably predetermined such that it is (inevitably) exceeded when the airbag is triggered. However, this is not mandatory. It is also conceivable, for example, to set the force threshold higher and to take into account in this respect that an additional force may result from, for example, the fact that the child's body influences the distribution of the forces resulting from the inflation of the gas bag.

At this point, it should be noted that all the parts described above, taken individually and in any combination, in particular the details shown in the drawings, are claimed as further developments of the invention. Modifications thereof are possible.

It should further be pointed out at this point that all the parts or features described above are each on their own—even without features additionally described in the respective context, even if these have not been explicitly identified individually as optional features in the respective context, e.g. by using: in particular, preferably, for example, e.g., optionally/possibly/if necessary, round brackets etc.,—or in combination or any sub-combination are to be regarded as independent embodiments or further developments of the invention, such as they are defined in particular in the introduction to the description and the claims. Deviations from this are possible. Specifically, it should be noted that the words in particular or round brackets are intended to explicitly characterise non-mandatory features in the respective context.

Finally, it is pointed out that the present application for an industrial property right (in the event of registration or grant: the present industrial property right) aims to have a protection as broad as possible. It is requested that this be borne in mind when reading, in particular in so far as (intermediate) generalisations of explicitly disclosed features or combinations of features are concerned.

REFERENCE SIGNS

T transverse direction
10 child seat
20 main body
21 seat section
21R right side (of the seat section)
21L left side (of the seat section)
21B bottom side/underside (of the seat section)
21M centre section (of the seat section)
22 backrest
23 side wings/side bolster
24 headrest
25 support foot
26 top tether
27 first fastening means
28 second fastening means
29 side impact protection
31 third fastening means
50 impact shield
51 central impact shield section 51B bottom surface/lower surface (of the centre section of the impact shield)
51I inner surface/rear surface (of the centre impact shield section)
51T upper surface (of the central section of the impact shield)
51O outer surface/upper surface (of the central section of the impact shield)
52 left impact shield section
53 right impact shield section
54 fixed section (of the impact shield)
55 cushioning means (of the impact shield)
56 sixth fastening means
57 cover
58 first section
59 second section
60 inner mantle
61 tear seam
62 belt guide
70 airbag
71 gas bag
71c contact surface
71s support surface
72 gas generator
73 controller
74 sensor
75 connection
76 gas connection
77 guiding device
78 proximal section
79 distal section
80 gas outlet
81 gas inlet
82 sealing
83, 83' coupling means
84 channel
90 base
90B bottom side/lower side (of the base)
91 fifth fastening means
92 support foot
93 fourth fastening means
121 first gap
122 second gap
110 support element
111 web
112 groove

The invention claimed is:

1. A child restraint device, including a child seat or an impact shield for mounting in a vehicle, the device comprising at least one airbag with at least one inflatable gas bag and at least one gas generator,
wherein the gas bag is transferable from a non-inflated state to an inflated state, wherein the airbag is at least substantially non-folded in the non-inflated state,
wherein an outer surface of the gas bag in the non-inflated state of the gas bag is configured such that, for at most 25% of an outer surface applies that a respective outer surface perpendicular intersects the outer surface at a second point of the outer surface, and
wherein, in the non-inflated state of the at least one gas bag, at most 25% of the outer surface of the gas bag directly abuts on another part of the outer surface.

2. The child restraint device according to claim 1, wherein for at most 25% of the outer surface of the gas bag in the non-inflated state it applies that a respective starting point under observation of the outer surface abuts on a further point of the outer surface which is not directly adjacent to the starting point.

3. The child restraint device according to claim 1, wherein for at most 25% of the outer surface of the gas bag in the non-inflated state it applies that to a respective starting point under observation of the outer surface there is a further point on the outer surface which can be reached via a shortest path along the surface of the gas bag of ≥1 cm and at a same time can be reached via a shortest straight path of ≤0.5 cm.

4. The child restraint device according to claim 1, wherein at least one guiding device for guiding a gas flow during the transfer from the non-inflated to the inflated state is associated with the at least one gas bag.

5. The child restraint device according to claim 4, wherein the guiding device comprises at least one local fixation of at least a section of an inner wall of the gas bag.

6. The child restraint device according to claim 1, wherein the gas generator is arranged in an interior of the gas bag or on an underside or front side of the gas bag or wherein at least one gas inlet opening into the gas bag is arranged in a lower or front area of the gas bag.

7. The child restraint device according to claim 6, wherein the gas generator is not arranged on an upper side or not on a rear side of the gas bag or wherein the gas inlet opening into the gas bag is not arranged in an upper area or not in a rear area of the gas bag.

8. The child restraint device according to claim 1, wherein the gas generator is arranged to extend horizontally or transversely to a direction of view of the child or a direction of travel.

9. The child restraint device according to claim 1, wherein at least one pressure-limiting device is associated with the gas bag in such a way that, when a predetermined pressure is reached or exceeded at least locally, a pressure relief by flowing out of gas out of the gas bag takes place.

10. The child restraint device according to claim 9, wherein the at least one pressure-limiting device comprises at least one predetermined breaking point or a predetermined tearing point, or a tear seam, or at least one valve.

11. The child restraint device according to claim 9, wherein the predetermined pressure is at least 3 bar or at most 25 bar.

12. The child restraint device according to claim 1, comprising at least one first inner mantle surrounding the gas bag, which mantle is firmly connected to an impact shield main body or envelops the gas bag in such a way that the gas bag is inaccessible.

13. The child restraint device according to claim 12, wherein an outer mantle is arranged around the inner mantle, which outer mantle is elastic or can be removed from the impact shield main body by triggering the airbag or is detachably connected to the impact.

14. The child restraint device according to claim 12, wherein the inner mantle is elastic at least in sections or has at least one predetermined breaking point or at least one predetermined tearing point in such a way that the inner mantle breaks open or tears open when the airbag is triggered.

15. The child restraint device according to claim 1, wherein the gas bag at least in sections, completely, or in the inflated state, covers an upper side, an underside, and a rear side of the impact shield.

16. A child restraint device according to claim 1,
wherein the gas bag at least in sections, completely, or at least in the inflated state or in the non-inflated state does not cover a front side of the impact shield.

17. A child restraint device comprising at least one airbag with at least one inflatable gas bag,
wherein the gas bag has at least one coupling means for coupling the gas bag to the child restraint device and is transferable from a non-inflated state to an inflated state,
wherein the at least one coupling means is designed to release the coupling when a predetermined force threshold is exceeded.

18. The child restraint device according to claim 17, wherein the gas bag has at least one connecting device for connecting the gas bag to a support device.

19. The child restraint device according to claim 17,
wherein at least one gas bag is attached to a seat area underside or at least one gas bag is attached to a base underside of a base of the child seat to which a main body is attached or is attachable.

20. A method of manufacturing or configuring a child restraint device or a component of such a device according to claim 1, wherein the gas bag is fixed or stowed in the non-inflated state such that it is at least substantially non-folded or is fixed or stowed such that an outer surface of the gas bag in the non-inflated state of the gas bag is configured such that for at most 25% of the outer surface it applies that a respective outer surface perpendicular intersects the outer surface at a second point of the outer surface or is fastened or stowed such that in the non-inflated state of the at least one gas bag at most 25% of the outer surface of the gas bag directly abut on another part of the outer surface.

* * * * *